US008699531B2

(12) United States Patent
Kimura et al.

(10) Patent No.: US 8,699,531 B2
(45) Date of Patent: *Apr. 15, 2014

(54) MOBILE COMMUNICATION SYSTEM AND COMMUNICATION METHOD THEREOF

(75) Inventors: Bun Kimura, Kawasaki (JP); Eiji Ikeda, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 185 days.

This patent is subject to a terminal disclaimer.

(21) Appl. No.: 13/368,046

(22) Filed: Feb. 7, 2012

(65) Prior Publication Data

US 2012/0134274 A1    May 31, 2012

Related U.S. Application Data

(62) Division of application No. 11/889,834, filed on Aug. 16, 2007, now Pat. No. 8,189,629.

(30) Foreign Application Priority Data

Sep. 14, 2006 (JP) ................................ 2006-249289

(51) Int. Cl.
    *H04J 3/04*  (2006.01)
(52) U.S. Cl.
    USPC ............ 370/536; 370/230; 370/394; 370/473
(58) Field of Classification Search
    USPC .............. 370/230, 230.1, 235, 536, 473, 474, 370/394, 396
    See application file for complete search history.

(56) References Cited

U.S. PATENT DOCUMENTS

| 5,920,817 A | 7/1999 | Umeda et al. |
| 6,034,946 A | 3/2000 | Roginsky et al. |
| 6,975,604 B1 | 12/2005 | Ishida et al. |

(Continued)

FOREIGN PATENT DOCUMENTS

| DE | 10258425 A1 | 7/2004 |
| EP | 1189405 A1 | 3/2002 |

(Continued)

OTHER PUBLICATIONS

Japanese Notification of Reasons for Refusal dated Jun. 22, 2011 for application No. 2006-249289.

(Continued)

*Primary Examiner* — Kwang B Yao
*Assistant Examiner* — Nguyen Ngo
(74) *Attorney, Agent, or Firm* — Smith, Gambrell & Russell, LLP

(57) ABSTRACT

A communication method in a mobile communication system that transmits different data to which transmission sequence numbers have been attached, over each of a plurality of paths from a mobile station to a radio network controller via a plurality of base stations; where the radio network controller monitors the communication state of each path, determines to transmit the data over all of a plurality of paths, transmit the data over two or more specified paths, or transmit the data over only one specified path, based on the communication state of each path, and notifies the mobile station of the determined path/paths; and where the mobile station transmits different data to which different transmission sequence numbers have been attached, over said notified path/paths, and the radio network controller rearranges the data received from each path by reference to the transmission sequence numbers and transmits the rearranged data to a core network.

4 Claims, 25 Drawing Sheets

(56) References Cited

U.S. PATENT DOCUMENTS

| | | | |
|---|---|---|---|
| 7,224,964 | B2 | 5/2007 | Souissi et al. |
| 7,406,048 | B2 | 7/2008 | Datta et al. |
| 7,480,243 | B2 | 1/2009 | Gruhl et al. |
| 7,817,668 | B2 * | 10/2010 | Igarashi et al. ............... 370/474 |
| 7,872,996 | B2 * | 1/2011 | Kimura et al. ................ 370/312 |
| 8,189,629 | B2 * | 5/2012 | Kimura et al. ................ 370/536 |
| 2002/0102987 | A1 | 8/2002 | Souisse et al. |
| 2004/0196870 | A1 | 10/2004 | Cheng et al. |
| 2005/0249160 | A1 * | 11/2005 | Tomita et al. ................ 370/329 |
| 2006/0193276 | A1 * | 8/2006 | Sakata ........................ 370/310 |
| 2008/0051123 | A1 | 2/2008 | Shinozaki |
| 2008/0069043 | A1 | 3/2008 | Kimura et al. |
| 2008/0108364 | A1 * | 5/2008 | Nishimura et al. ........... 455/450 |
| 2008/0130564 | A1 | 6/2008 | Gallagher et al. |
| 2008/0175249 | A1 | 7/2008 | Yi et al. |
| 2008/0268907 | A1 | 10/2008 | Senarath et al. |
| 2009/0275337 | A1 | 11/2009 | Maeda et al. |
| 2010/0232293 | A1 | 9/2010 | Sagfors et al. |

FOREIGN PATENT DOCUMENTS

| | | |
|---|---|---|
| JP | 9508773 | 9/1997 |
| JP | 200136964 A | 2/2001 |
| JP | 2007043331 A | 2/2007 |
| WO | 0217043 A2 | 2/2002 |
| WO | 2004093393 A1 | 10/2004 |

OTHER PUBLICATIONS

Chinese 2nd Notification of Office Action dated Apr. 14, 2011 for application No. 200710149249.9.

Extended European Search Report dated Nov. 13, 2007 for application No. 07114304.4-2416 Reference No. P109145EP00/DNL, 7pgs.

Non-Final Office Action dated Dec. 7, 2010 received in U.S. Appl. No. 11/889,834.

Final Office Action dated May 10, 2011 received in U.S. Appl. No. 11/889,834.

Advisory Action dated Jul. 28, 2011 received in U.S. Appl. No. 11/889,834.

Non-Final Office Action dated Aug. 23, 2011 received in U.S. Appl. No. 11/889,834.

Notice of Allowance dated Jan. 27, 2012 received in U.S. Appl. No. 11/889,834.

First Notification of Office Action dated Jan. 8, 2010 in corresponding Patent Application No. 200710149249.9.

Chinese Rejection decision dated May 4, 2012 received in Application No. 200710149249.9.

Japanese Notification of Reason for Refusal dated Feb. 22, 2012 issued in application No. 2006-249289.

Notice of Allowance dated Jan. 27, 2012 issued in U.S. Appl. No. 11/889,834.

* cited by examiner

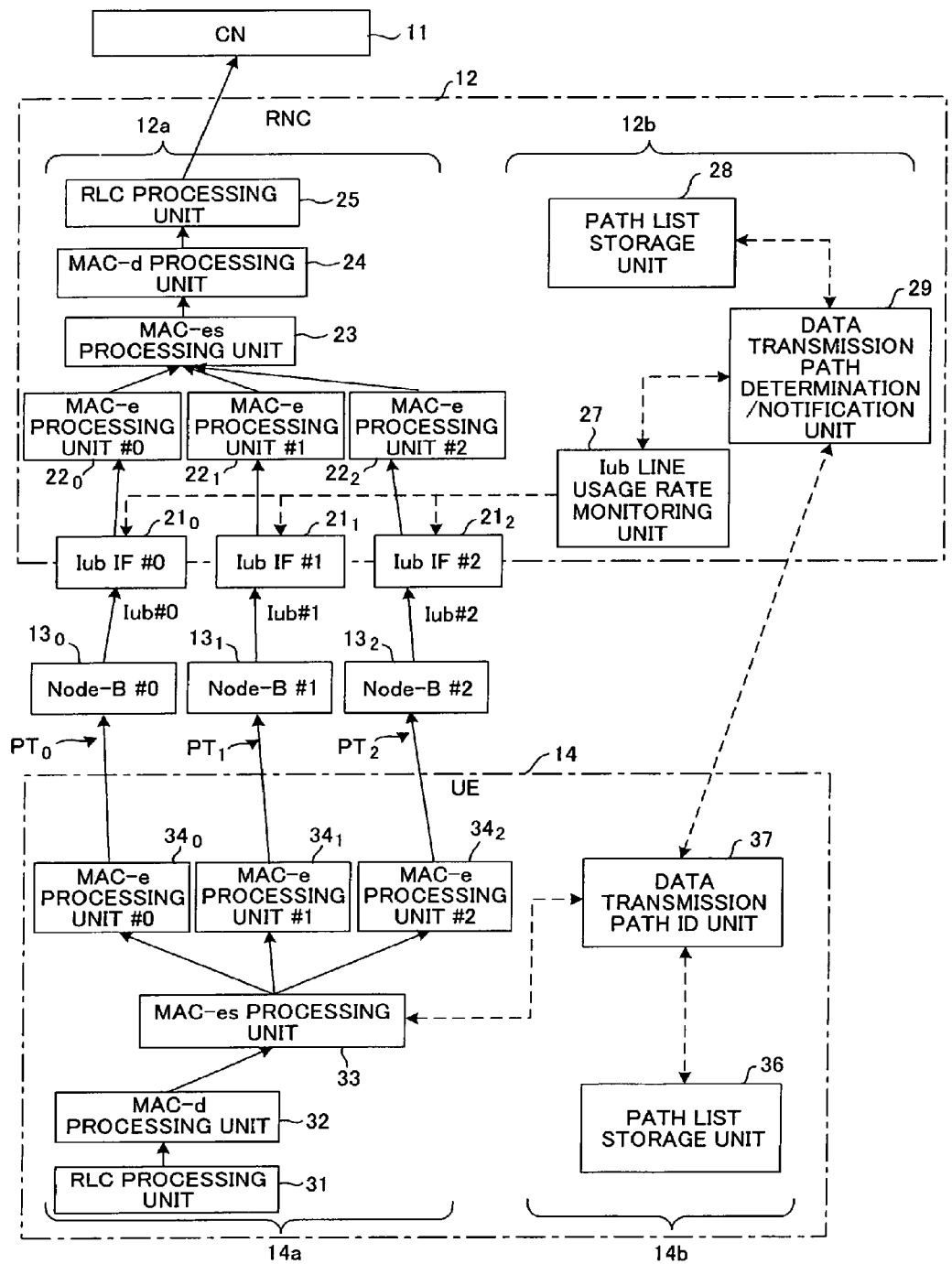

FIG. 2

| DATA TRANSMISSION PATTERN ID (IDENTIFIER) | TSN NUMBERS ATTACED WITHIN A TIME SLOT (1 TO 3) | TRANSMISSION OBJECT (MAC-e) WITHIN A TIME SLOT | | | EXPLANATION OF PROCESSING FOR MAC-es |
|---|---|---|---|---|---|
| | | #0 ($PT_0$) | #1 ($PT_1$) | #2 ($PT_2$) | |
| 1 | 1 | Org | — | — | TSN IS ATTACHED TO MAC-es PDU AND SENT ONLY TO MAC-e #0 |
| 2 | 1 | — | Org | — | TSN IS ATTACHED TO MAC-es PDU AND SENT ONLY TO MAC-e #1 |
| 3 | 1 | — | — | Org | TSN IS ATTACHED TO MAC-es PDU AND SENT ONLY TO MAC-e #2 |
| 4 | 2 | Org | Org | — | TSN=X1 IS ATTACHED TO MAC-es PDU AND SENT TO MAC-e #0, AND TSN=X2 IS ATTACHED TO MAC-es PDU AND SENT TO MAC-e #1 |
| 5 | 2 | — | Org | Org | TSN=X1 IS ATTACHED TO MAC-es PDU AND SENT TO MAC-e #1, AND TSN=X2 IS ATTACHED TO MAC-es PDU AND SENT TO MAC-e #2 |
| 6 | 2 | Org | — | Org | TSN=X1 IS ATTACHED TO MAC-es PDU AND SENT TO MAC-e #0, AND TSN=X2 IS ATTACHED TO MAC-es PDU AND SENT TO MAC-e #2 |
| 7 | 3 | Org | Org | Org | TSN=X1 IS ATTACHED TO MAC-es PDU AND SENT TO MAC-e #0, TSN=X2 IS ATTACHED TO MAC-es PDU AND SENT TO MAC-e #1, AND TSN=X3 IS ATTACHED TO MAC-es PDU AND SENT TO MAC-e #2 |

FIG. 6

| Time Slot | ATTACHED TSN | DATA TO BE TRANSMITTED TO THE TRANSMISSION OBJECT (MAC-e) | | |
|---|---|---|---|---|
| | | #0 | #1 | #2 |
| 1 | 1 | A1 | — | — |
| | 2 | — | A2 | — |
| | 3 | — | — | A3 |
| 2 | 4 | A4 | — | — |
| | 5 | — | A5 | — |
| | 6 | — | — | A6 |
| ⋮ | ⋮ | ⋮ | ⋮ | ⋮ |
| 5 | 13 | A13 | — | — |
| | 14 | — | A14 | — |
| | 15 | — | — | A15 |

FIG. 8

| Time Slot | ATTACHED TSN | DATA TO BE TRANSMITTED TO THE TRANSMISSION OBJECT (MAC-e) | | |
|---|---|---|---|---|
| | | #0 | #1 | #2 |
| 1 | 1 | A1 | — | — |
| | 2 | — | A2 | |
| 2 | 3 | — | A3 | — |
| | 4 | A4 | — | — |
| 3 | 5 | A5 | — | — |
| | 6 | — | A6 | — |
| ⋮ | ⋮ | ⋮ | ⋮ | ⋮ |
| N | X | Ax | — | — |
| | Y | — | Ay | — |

EDCH Iub FP

MOBILE COMMUNICATION SYSTEM AND COMMUNICATION METHOD THEREOF

CROSS-REFERENCE TO RELATED APPLICATIONS

This application is a divisional of U.S. patent application Ser. No. 11/889,834, filed Aug. 16, 2007, which is based upon and claims the benefit of priority from the prior Japanese Patent Application No. 2006-249289, filed on Sep. 14, 2006, the entire contents of both of which are incorporated herein by reference.

BACKGROUND OF THE INVENTION

The present invention relates to a mobile communication system and communication method thereof, and more particularly to a mobile communication system and communication method thereof that, during handover, copies and transmits data to which transmission sequence numbers have been added from a mobile station to each of a plurality of paths going to a radio network control apparatus by way of a plurality of base stations.

A W-CDMA mobile communication system is a radio communication system in which a plurality of users shares lines, and as shown in FIG. 14, comprises: a core network (CN) 1, radio network controllers (RNC) 2, 3, radio base stations (Nodes B) $4_1$ to $4_3$, $5_1$ to $5_3$, and mobile stations (UE: User Equipment) $6_1$ to $6_3$. The radio network controllers RNC and radio base stations (Nodes B) are connected by wired connections using an ATM network or IP network, and the radio base stations (Nodes B) and mobile stations UE are connected by radio connections.

The core network 1 is a network for performing routing in a mobile communication system, and the core network 1 can be constructed using an ATM switching network, packet switching network, router network, etc. The core network 1 is also connected to other public networks (PSTN), which makes it possible for the mobile stations $6_1$ to $6_3$ to perform communication with fixed telephones.

The radio network controllers (RNC) 2, 3, are positioned as superior devices of the radio base stations (hereafter referred to as base stations) $4_1$ to $4_3$, $5_1$ to $5_3$, and they perform control (management of the radio resources that are used) of these base stations. The RNC also has a handover control function that, during handover, receives a signal from one mobile station 6i by way of the plurality of base stations, then selects data having the best quality and transmits that data to the core network 1. The radio resources for the base stations $4_1$ to $4_3$ are managed by the RNC 2 and the radio resources for the base stations $5_1$ to $5_3$ are managed by the RNC 3, while the base stations $4_1$ to $4_3$ and $5_1$ to $5_3$ perform radio communication with a mobile station 6i. When a mobile station 6i is within the radio area of a base station, a radio connection is established with that base station, and communication is performed with another communication apparatus by way of the core network 1.

An interface Iu is set as the interface between the core network 1 and RNCs 2, 3, and the interface Iub is set as the interface between the RNCs 2, 3 and each of the base stations $4_1$ to $4_3$, $5_1$ to $5_3$, and the interface Uu is set as the interface between the base stations $4_1$ to $4_3$, $5_1$ to $5_3$ and the mobile stations $6_1$ to $6_3$.

In this mobile communication system, in order to make high speed data transmission in the DOWN direction possible, the HSDPA (High Speed Downlink Packet Access) method is used, and in order to make high speed data transmission in the UP direction possible, the HSUPA (High Speed Uplink Packet Access) method is proposed. The HSUPA method is a broadband data transmission function for the purpose of increasing performance of a dedicated channel when a mobile station transfers data in the UP direction, and particularly is a data transmission function used in the UP direction when the mobile station is in the handover state.

FIG. 15 is a drawing that explains the logical connection of the HSUPA method during handover. The mobile station 6 is connected to the radio network controller 2 by a plurality of paths via base stations $4_1$ to $4_3$ and IP network 7, and the mobile station 6 makes a number of copies of the data to be transmitted that corresponds to the number of paths, then transmits the copied data to the radio network controller 2 via each of the paths. When doing this, the mobile station 6 attaches a TSN (Transmission Sequence Number) that indicates the data transmission sequence to each data. In other words, as shown in FIG. 16, when transmitting data Xn to the core network 1, the mobile station 6 copies that data Xn a number of times that corresponds to the number of paths (three in the figure), attaches the same transmission sequence number (TSN) to each copy of the data Xn and transmits the data Xn to the RNC 2 via each of the paths.

The RNC 2 receives the data Xn via each of the paths, rearranges the received data using the TSN, performs selection combining of the data and then transmits the selected data to the core network CN. In the HSPUA system, the method for the RNC to use the plurality of identical data Xn received via the plurality of paths is not regulated, and that identical plurality of received data Xn can be arbitrarily handled by any method as long as the data transmission sequence is sufficiently assured based on the TSN.

FIG. 17 is a drawing showing the layer structure of each unit in the HSUPA method, where the mobile station (UE) comprises a physical layer (PHY) of layer L1 and MAC sub layers (MAC-d, MAC-es/MAC-e) of layer L2. The MAC sub layers comprise a MAC-d (MAC-dedicated) layer, MAC-e (MAC-enhanced) layer, and MAC-es layer (MAC-enhanced sub layer). The base station (Node B) comprises a physical layer (PHY) for communicating with a mobile station by the Uu interface, and a TNL layer (Transport Network Layer) for packet communication with the radio network controller (RNC) by the Iub interface. Moreover, it comprises a MAC-e layer and EDCH FP (Enhanced DCH Frame Protocol) layer. The radio network controller comprises a TNL layer, EDCH FP layer, MAC-es layer and MAC-d layer.

FIG. 18 is a drawing that explains the procedure for creating a data (transport block) TRB by the mobile station. First, the mobile station 6 uses data that is sent via a dedicated channel DCH such as a DTCH (Dedicated Traffic Channel) or DCCH (Dedicated Control Channel) to create a data packet (MAC-d PDU data) for the MAC-d layer. This MAC-d PDU data is the same as the data packet (RLC PDU data) of the RLC sub layer. Next, the mobile station multiplexes several MAC-d PDU data, attaches a transmission sequence number TSN to the start, and creates the data (MAC-es PDU) of the MAC-es layer. After that, the mobile station multiplexes a plurality of these MAC-es PDU data, attaches a MAC-e header to the start, creates the data (MAC-e PDU) of the MAC-e layer and transmits this data as a transport block TRB to the base station by the Uu interface. The MAC-e header specifies the DDI (Data Description Identifier) and N of each MAC-es PDU data, where N specifies the number of MAC-d PDU data that is included in the MAC-es PDU data, and DDI specifies the size and ID of each MAC-d PDU data.

FIG. 19 is a drawing that explains the multiplexing relationship of the MAC-d PDU, MAC-es PDU and MAC-e PDU data, where N1 number of MAC-d PDU are multiplexed to create one MAC-es PDU, and n number of MAC-es PDU are multiplexed to create one MAC-e PDU.

When the base station receives a transport block (MAC-e PDU) from the mobile station, it creates an EDCH Iub FP frame as shown in FIG. 20 according to EDCH FP protocol, and transmits it to the RNC in a TNL layer. In other words, the base station adds the starting 5-byte data (header CRC, FSN (Frame Sequence Number), CFN (Connection Frame Sequence) and N of MAC-es PDU (number of sub frames, etc.) to the MAC-e PDU header, adds the number of retransmissions of each MAC-es PDU (N of HARQ Retransm) to the MAC-e PDU header, and creates an EDCH Iub FP frame.

As shown in FIG. 21, in the case where the radio network controller RNC receives an EDCH Iub FP frame for each logical channel, the RNC performs retransmission control (HARQ control) and, in addition by reference to the MAC-e header it divides the MAC-e PDU into MAC-es PDU, and further divides the MAC-es PDU into MAC-d PDU. Next, since there is a plurality of paths between the RNC and UE, the radio network controller RNC performs rearrangement of the received data and selection combining of the data by reference to the transmission sequence number TSN that is attached to data by the mobile station when transmitting data, thereafter gives that rearranged MAC-d PDU to the RLC sub layer (higher-order protocol), and transmits dedicated-channel data to the core network via that RLC sub layer.

In the conventional HSPUA function described above, there are the following problems.

Problem No. 1

The first problem is that, when the number of paths over which the copied data are transmitted is taken to be m, the overall used bandwidth of the Iub line between the RNC and base station increases by m times, which places a very large load on the Iub line.

As shown in FIG. 16, data is transmitted between the mobile station 6 and RNC 2 via three paths (branches). In other words, the mobile station 6 transmits the same data over the three paths #0, 1, 2, the RNC 2 performs selection combining of the data that is obtained from each path, then extracts one data flow and transmits it to the core network 1. Therefore, in the case where the mobile station 6 transmits 10 MB of data to the core network, the mobile station transmits 10 MB of data over each of the three Iub lines for a total of 30 MB, and the RNC selects just 10 MB from among that data and transmits it to the core network. When taking a comprehensive look, 20 MB of data of the 10 MB×3=30 MB of data are useless data.

Considering that the Iub line belongs to a typical IP network, the large load on that Iub line adversely affects other communication services (lost or delayed packets), and as a result, in order to perform highly reliable communication, the communication cost becomes high.

Problem No. 2

The second problem is that the data to be processed by the MAC-es processing unit of the RNC 2 increases.

Like the first problem, the amount of data input to the MAC-es processing unit increases, and the ratio between the amount of input data and amount of output data is 3:1. In order to perform selection combining of the data, the input data must be held in a buffer, however, when the amount of data that is transmitted from the mobile station 6 is large, the amount of buffered data becomes extremely large, and large processing capability is required. As a result, there is a problem in that the cost of the RNC 2 increases and the size of the RNC 2 also increases.

Problem No. 3

The third problem is that the power consumed by the mobile station to transmit data increases. HSUPA is a function for the purpose of transmitting a large amount of data, and requires that the mobile station copy data a number of times that corresponds to the number of paths. Therefore, there is a problem in that a large amount of power is required by the mobile station 6 to transmit the data.

Flow control technology has been proposed for HSDPA and HSUPA as prior art (see JP 2004-312739A). This prior art makes the size of data frames equal to or less than the size that corresponds to the scheduling interval when data frames are sent and received between the RNC and base station by the Iub interface. However, the prior art does not solve the aforementioned problems due to the transmission of data by way of a plurality of paths.

SUMMARY OF THE INVENTION

Taking the aforementioned problems into consideration, the object of the present invention is eliminate any large load that is applied to the Iub line by not transmitting data over a line whose line usage rate is large.

Another object of the present invention is shorten transmission time by transmitting different data over each path whose line usage rate is low.

Moreover, another object of the present invention is to lighten the amount of data to be processed by the MAC-es processing unit of the RNC.

Furthermore, another object of the present invention is to reduce the amount of power consumed by the mobile station.

Communication Method

A first form of the present invention is a communication method in a mobile communication system that transmits different data to which transmission sequence numbers have been attached, over each of a plurality of paths from a mobile station to a radio network controller via a plurality of base stations, comprising: a step of monitoring the communication state of each path by the radio network controller; a step of determining to transmit data over all of a plurality of paths, transmit data over two or more specified paths, or transmit data over only one specified path based on the communication state of each path; a step of notifying the mobile station of the determined path/paths; and a step of transmitting said respective different data to which different transmission sequence numbers have been attached, over said notified path/paths from the mobile station to the radio network controller.

The communication method described above further comprises a step of rearranging said data received from each path by reference to said transmission sequence numbers in the radio network controller and transmitting the data to a core network from the radio network controller.

The communication method described above further comprises in the radio network controller; a step of notifying the mobile station of a correlation list that correlates path information that indicates which path/paths data is to be transmitted over and an identifier that specifies that path information; and a step of notifying the mobile station of said determined path/paths using the identifier.

The radio network controller monitors, in said communication state monitoring step, the line usage rate of each path between the base stations and radio network controller; and determines in said path determination step, to transmit said data over the path/paths whose line usage rate is less than a set value.

Radio Network Controller

A second form of the present invention is a radio network controller in a communication system that transmits different data to which transmission sequence numbers have been attached, over each of a plurality of paths from a mobile station to a radio network controller via a plurality of base stations, comprising: a communication state monitoring unit that monitors the communication state of each path; a data transmission path notification unit that determines to transmit data over all of a plurality of paths, transmit data over two or more specified paths, or transmit data over only one specified path based on the communication state of each path, and notifies the mobile station of the determined path/paths; and a processing unit that rearranges the data received from said determined path/paths by reference to said transmission sequence numbers and transmits the data to a core network.

The radio network controller further comprises a list storage unit that stores a correlation list that correlates path information that indicates which path/paths data is to be transmitted over, and an identifier that specifies that path information; wherein said data transmission path notification unit notifies the mobile station of said correlation list, and uses the identifier to notify the mobile station of said determined path/paths.

The communication state monitoring unit comprises a line usage rate monitoring unit that monitors the line usage rate of each path between the base stations and radio network controller; and said data transmission path notification unit determines to transmit said data over the path/paths whose line usage rate is less than a set value.

Mobile Station

A third form of the invention is a mobile station in a mobile communication system that transmits different data to which transmission sequence numbers have been attached, over each of a plurality of paths from a mobile station to a radio network controller via a plurality of base stations, comprising: a list storage unit that receives and stores a correlation list from a radio network controller that correlates path information that indicates which path/paths data is to be transmitted over, and an identifier that specifies that path information; a data transmission path receiving unit that receives an identifier from the radio network controller that indicates which path/paths said data is to be transmitted over, and makes a reference to said correlation list to obtain the path/paths that correspond to the identifier; and a processing unit transmits different data, to which transmission sequence number have been attached, over the path/paths that correspond to said identifier.

Mobile Communication System

A fourth form of the present invention is a mobile communication system that transmits different data to which transmission sequence numbers have been attached, over each of a plurality of paths from a mobile station to a radio network controller via a plurality of base stations, wherein said radio network controller comprises: a communication state monitoring unit that monitors the communication state of each path; a data transmission path notification unit that determines to transmit data over all of a plurality of paths, transmit data over two or more specified paths, or transmit data over only one specified path based on the communication state of each path, and notifies the mobile station of the determined path/paths; and a processing unit that rearranges the data received from said determined path/paths by reference to said transmission sequence numbers and transmits the data to a core network; and said mobile station comprises: a receiving unit that receives transmission path specification information from the radio network controller that specifies which path/paths data is to be transmitted over; and a processing unit that transmits different data to which transmission sequence numbers have been attached, over the specified path/paths.

The radio network controller further comprises a correlation list storage unit that stores a correlation list that correlates path information that indicates which path/paths data is to be transmitted over, and an identifier that specifies that path information; said mobile station further comprises a list storage unit that receives and stores said correlation list from the radio network controller; and said data transmission path notification unit uses the identifier to notify the mobile station of said determined path/paths; and said receiving unit makes a reference to said correlation list to obtain the path/paths that correspond to the identifier received from the radio network controller and inputs the path/paths to the processing unit.

According to the present invention, it is possible for the mobile station to control the amount of transmission data by changing the number of data transmission paths in conformity with the communication state of the paths. For example, construction is such that the line usage rate of each of the paths between the base stations and the radio network controller is monitored and data is transmitted over a path/paths whose line usage rate is less than a set value and data is not transmitted over a path/paths whose line usage rate is greater than a set value. As a result, according to the present invention, it is possible to avoid applying a large load to the Iub line, and thus it is possible to eliminate adverse effects (lost or delayed packets) on other communication services.

Also, according to the present invention, a mobile station transmits different data, to which transmission sequence numbers have been attached, over each of a plurality of paths to a radio network controller, so it is possible to shorten the data transmission time.

Moreover, according to the present invention, by dynamically changing the line used to correspond to the network environment, it is possible to improve the data quality and the communication efficiency.

Furthermore, according to the present invention, different data, to which transmission sequence numbers have been attached, are transmitted over each paths to a radio network controller, so the radio network controller does not require a buffer for selection combining of the data, and thus it is possible to prevent an increase in the cost and size of the apparatus.

Also, according to the present invention, the radio network controller notifies the mobile station of a correlation list that correlates path information that indicates which path/paths data is to be transmitted over, and an identifier that specifies that path information, and the radio network controller uses that identifier to notify the mobile station of the path/paths over which data is to be transmitted, so it is possible to notify the mobile station of the path/paths over which to transmit data without affecting the traffic.

Other features and advantages of the present invention will be apparent from the following description taken in conjunction with the accompanying drawings.

BRIEF DESCRIPTION OF THE DRAWINGS

FIG. 1 is a drawing showing part of the construction of the mobile communication system of the present invention.

FIG. 2 is a drawing that explains a path list PLT.

FIG. 6 is a drawing for explaining the TSN that are assigned by the MAC-es processing unit of the mobile station for each time slot, and the transmission data image to MAC-e.

FIG. 8 is a drawing for explaining the TSN that are assigned by the MAC-es processing unit of the mobile station for each time slot, and the transmission data image to MAC-e.

DESCRIPTION OF THE PREFERRED EMBODIMENTS

Figure 3:
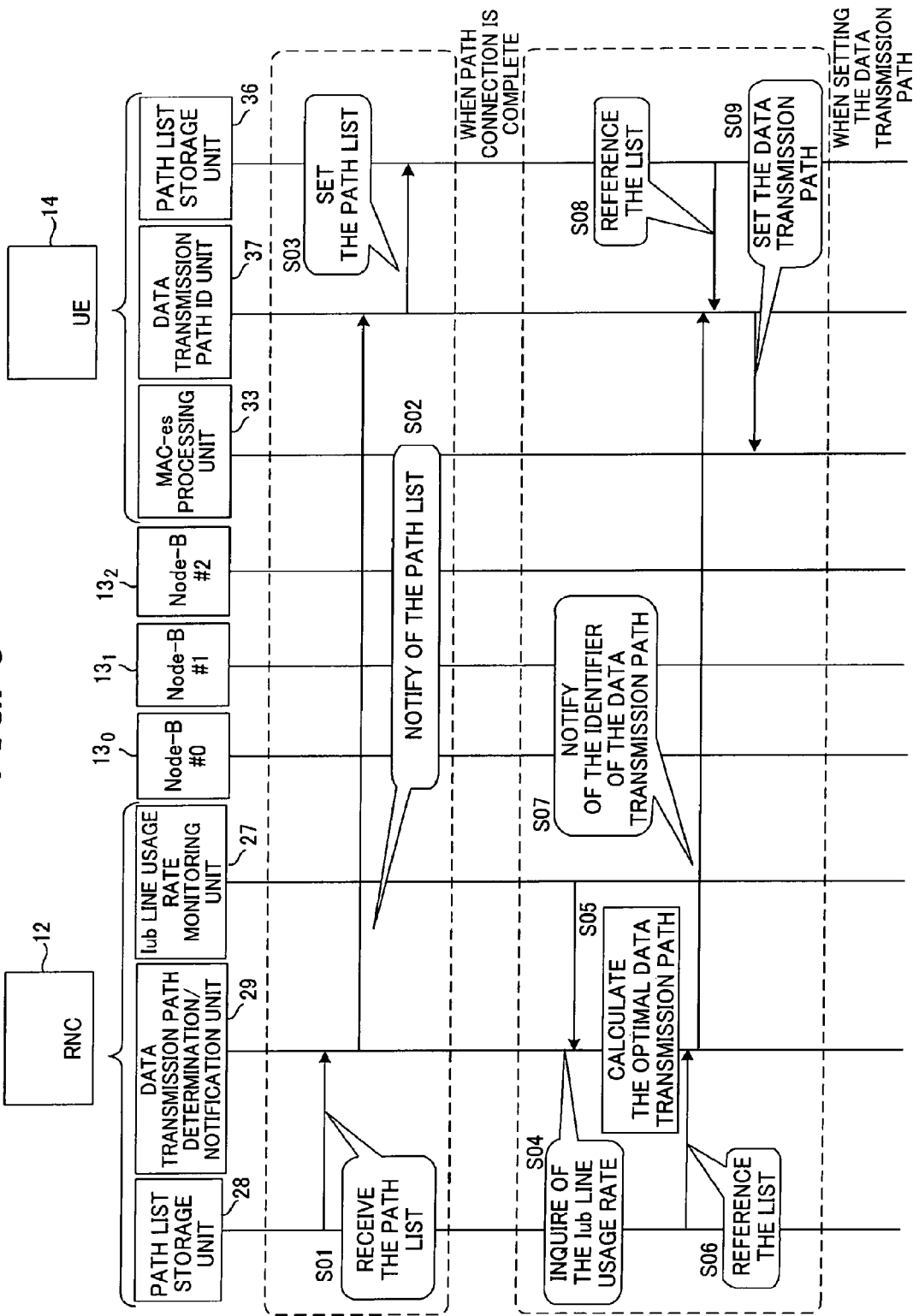
FIG. 3 is a drawing of a sequence for explaining initial setting of the path list and notification control for identifiers.

(A) Construction of a Mobile Communication System

FIG. 1 is a drawing showing part of the construction of the mobile communication system of the present invention, comprising: a core network (CN) 11, one radio network controller (RNC) 12, three radio base stations (Nodes B) $13_0$ to $13_2$, and one mobile station (UE: User Equipment) 14, where the mobile station 14 reaches a cell boundary and is in a soft handover state, and it is connected with the RNC 12 via paths PT0 to PT2. The radio base stations (Nodes B) $13_1$ to $13_3$ exist in each of the paths PT0 to PT2, and communication is performed between the mobile station 14 and each of the base stations by way of the Uu interface, and communication is performed between each of the base stations $13_1$ to $13_3$ and the radio network controller 12 by way of the Iub interface. The data flow is shown by the solid lines, and the flow of the control signals is shown by the dashed lines.

Radio Network Controller

The radio network controller 12 comprises: a processing unit 12a that performs processing on the frames received from the base stations; and a path control unit 12b that performs control of determining which path/paths the mobile station 14 is to transmit data over. The processing unit 12a comprises: Iub interfaces $21_0$, $21_1$, $21_2$, MAC-e processing units $22_0$, $22_1$, $22_2$, a MAC-es processing unit 23, a MAC-d processing unit 24 and RLC processing unit 25.

The Iub interfaces $21_0$, $21_1$, $21_2$ control communication with the base stations, as well as measure and store the Iub line usage rates. The MAC-e processing units $22_0$, $22_1$, $22_2$ use the Iub FP frames (see FIG. 20) that are received from the base stations to perform MAC-e processing, and divide out the MAC-es PDU data and input that data to the MAC-es processing unit 23. The MAC-es processing unit 23 further divides out the MAC-d PDU data from the MAC-es PDU data that was divided out in each MAC-e processing, and by reference to the transmission sequence number TSN, rearranges the data and inputs that data to the MAC-d processing unit 24. The MAC-d processing unit 24 gives the MAC-d PDU data to the RLC processing unit 25 as is as RLC-PDU data, and the RLC processing unit 25 selects specified RLC-PDU data from among the data obtained from each path, removes the header and transmits that data as individual data to the core network 11.

The path control unit 12b comprises: an Iub line usage rate monitoring unit 27, path list storage unit 28 and data transmission path determination/notification unit 29. The Iub line usage rate monitoring unit 27 makes an inquiry to each of the Iub interfaces $21_0$, $21_1$, $21_2$ of the usage rate of the Iub lines, and monitors the Iub line usage rates between each of the base stations (Nodes B) $13_0$ to $13_2$ and the radio network controller 12. The path list storage unit 28 stores a path list PLT that correlates path information that indicates over which path/paths the mobile station transmits data, and an identifier (data transmission pattern ID) that specifies that path information.

FIG. 2 is a drawing explaining the path list PLT in a case where three paths are connected between a mobile station and radio network controller due to a handover. The identifier ID=1 specifies transmitting one set of data over path PT0, identifier ID=2 specifies transmitting one set of data over path PT1, identifier ID=3 specifies transmitting one set of data over path PT2, identifier ID=4 specifies transmitting two different sets of data over respective paths PT0, PT1, ID=5 specifies transmitting two different sets of data over respective paths PT1, PT2, ID=6 specifies transmitting two different sets of data over respective paths PT2, PT0, and identifier ID=7 specifies transmitting three different sets of data over respective paths PT0, PT1, PT2. In the figure, org means original data.

For example, when identifier ID=1 is specified, the MAC-es processing unit (described later) of the mobile station 14 creates one set of MAC-es PDU data for each time slot, attaches transmission sequence numbers TSN, inputs the data to one MAC-es processing unit, and that MAC-es processing unit multiplexes a plurality of MAC-es PDU data to create MAC-e data, then transmits that data over one path PT0.

Moreover, when identifier ID=4 is specified, the MAC-es processing unit of the mobile station 14 creates two different sets of MAC-es PDU data for each time slot, attaches different transmission numbers TSN (X1, X2) to the respective data, and inputs the data to two MAC-e processing units, and each respective MAC-e processing unit multiplexes a plurality of MAC-es PDU data to create MAC-e data, then transmits that data over two paths PT0, PT1.

Furthermore, when identifier ID=7 is specified, the MAC-es processing unit of the mobile station 14 creates three different sets of MAC-es PDU data for each time slot, attaches different transmission numbers TSN (X1, X2, X3) to the respective data, and inputs the data to three MAC-e processing units, and each respective MAC-e processing unit multiplexes a plurality of MAC-es PDU data to create MAC-e data, then transmits that data over three paths PT0, PT1, PT2.

Returning to FIG. 1, when the mobile station is connected to the radio network controller by a plurality of paths (three paths in the figure) due to handover control, the data transmission path determination/notification unit 29 transmits a path list PLT to the mobile station, and based on the Iub line usage rate for each path, determines whether to transmit data over three paths PT0 to PT2, transmit data over two specified paths, or transmit data over one specified path, and using an identifier notifies the mobile station of which path/paths was determined.

Mobile Station

Figure 18:
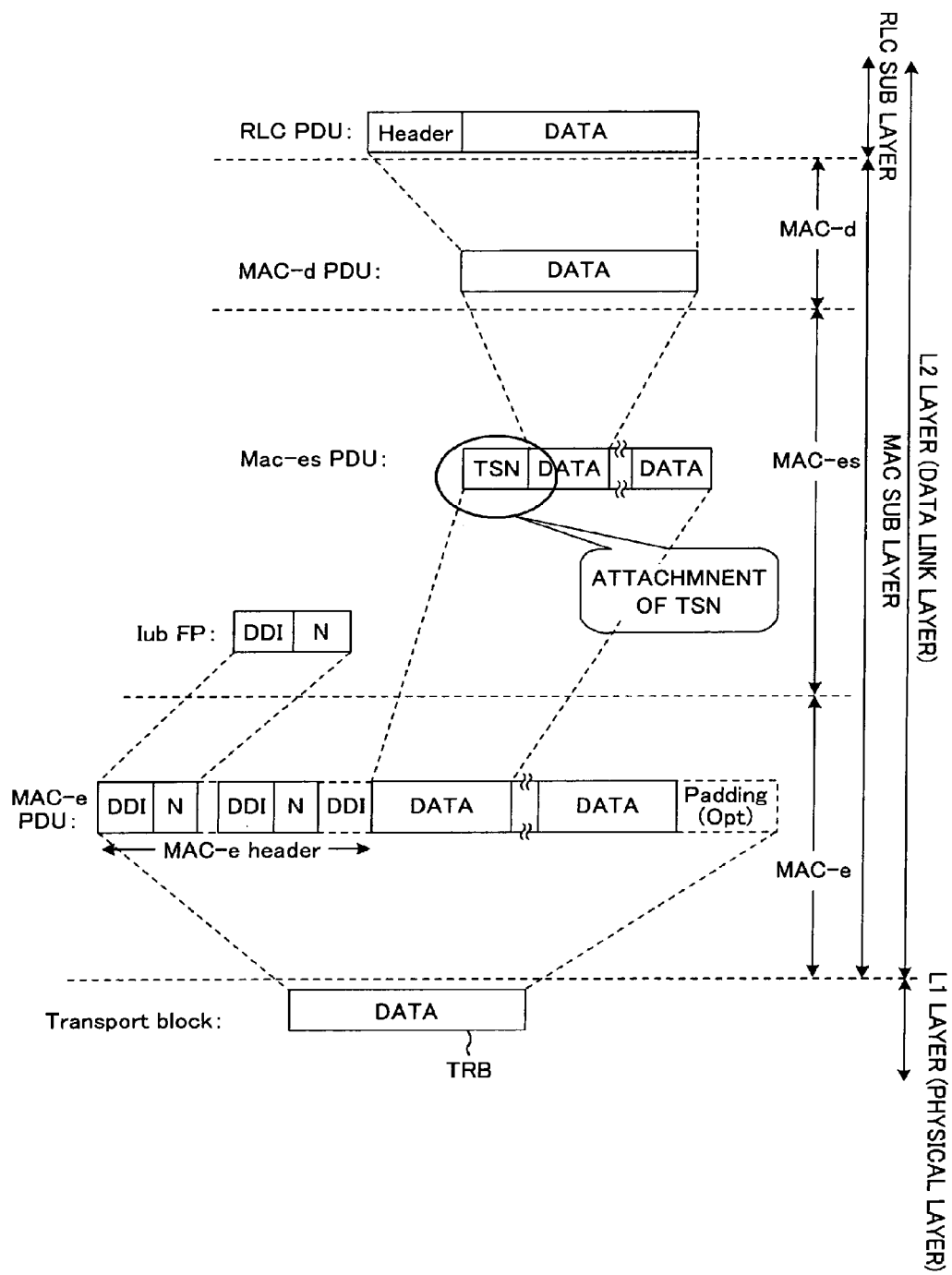
FIG. 18 is a drawing that explains the procedure for creating a data transport block TRB by the mobile station.
Figure 19:
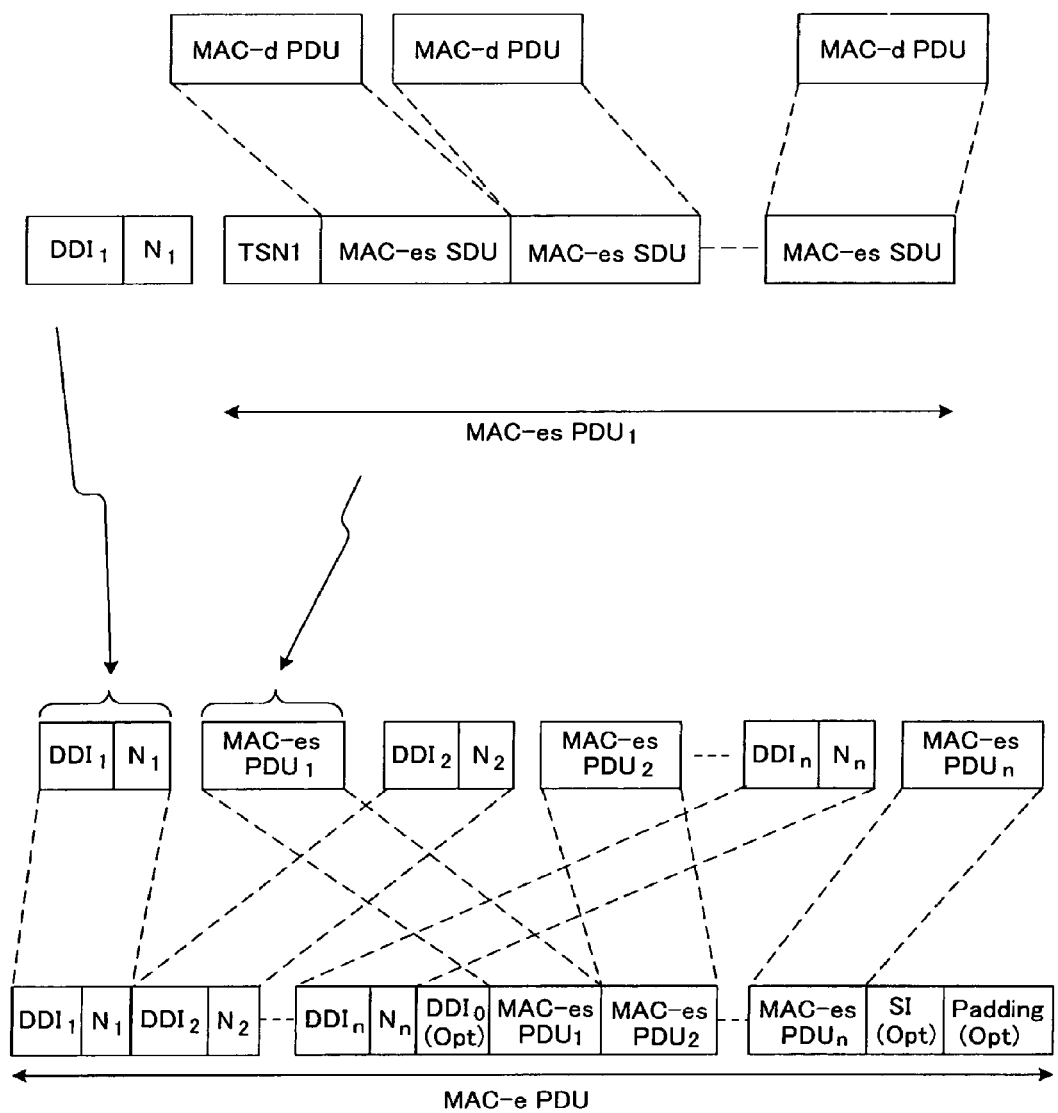
FIG. 19 is a drawing that explains the multiplexing relationship of the MAC-d PDU, MAC-es PDU and MAC-e PDU.

The mobile station comprises: a processing unit 14a that performs processing of creating transmission data (transport block data) and transmitting that data over a path/paths, and a path control unit 14b that performs control of determining which path/paths to transmit the data over. The processing unit 14a comprises: a RLC processing unit 31, a MAC-d processing unit 32, a MAC-es processing unit 33 and MAC-es processing units $34_0$ to $34_2$. The RLC processing unit 31 creates RLC PDU data from dedicated channel (DTCH, DCCH) data (see FIG. 18), and the MAC-d processing unit 32 receives that RLC PDU data as MAC-d PDU data and transmits it as is to the MAC-es processing unit 33. The MAC-es processing unit 33 multiplexes MAC-d PDU data, attaches a transmission sequence number TSN and creates MAC-es PDU data. The MAC-es processing unit 33 creates the specified number of different MAC-es PDU data for each time slot according to an instruction from the path control unit 14b, attaches transmission sequence numbers TSN to the data and inputs that data to the corresponding MAC-e processing units $34_0$ to $34_2$. The MAC-e processing units $34_0$ to $34_2$ multiplex a plurality of MAC-es PDU data to create MAC-e PDU data, and transmit that data over the corresponding paths PT0-PT2 as transport block data.

The path control unit 14b comprises a path list storage unit 36 and data transmission path ID unit 37. The data transmission path ID unit 37 receives the path list PLT (see FIG. 2) that is sent from the radio network controller 12 according to control by the data transmission path determination/notification unit 29 and stores that path list in the path list storage unit 36, as well as receives an identifier from the data transmission path determination/notification unit 29 that specifies the data transmission path/paths, makes a reference to the path list and obtains the transmission paths that correspond to that identifier, and then inputs the transmission paths to the MAC-e processing unit 33.

(B) Initial Setting of the Path List and Identifier Notification Control

FIG. 3 is a drawing explaining a sequence for explaining initial setting of the path list and identifier notification control. When due to handover control, the mobile station and radio network controller are connected by a plurality of paths, for example three paths, the data transmission path determination/notification unit 29 of the radio network controller 12 receives the path list PLT from the path list storage unit 28 (S01) and notifies the mobile station 14 (S02). The data transmission path ID unit 37 of the mobile station 14 notifies the path list storage unit 36 of the path list PLT that was sent from the radio network controller 12, and the path list storage unit 36 stores that path list (S03).

Next, the data transmission path determination/notification unit 29 makes an inquiry to the Iub line usage rate monitoring unit 27 of the Iub line usage status (S04), and based on the line usage rate of each Iub line Iub #0 to Iub #2, calculates the optimal data transmission path/paths (S05). Next, the data transmission path determination/notification unit 29 makes a reference to the path list PLT that is stored by the path list storage unit 28 to find the identifier that corresponds to the calculated transmission path/paths (S06), and notifies the mobile station 14 of that identifier (S07).

The data transmission path ID unit 37 of the mobile station 14 makes a reference to the path list PLT that is stored by the path list storage unit 36, finds the data transmission path/paths specified by the identifier (S08) and sets that data transmission path/paths in the MAC-es processing unit 33 (S09).

When HSUPA service is provided, by performing the processing of steps S04 to S09 in realtime according to the line status, the data transmission path/paths of the mobile station are changed, making it possible to transfer data more efficiently.

Figure 4A:
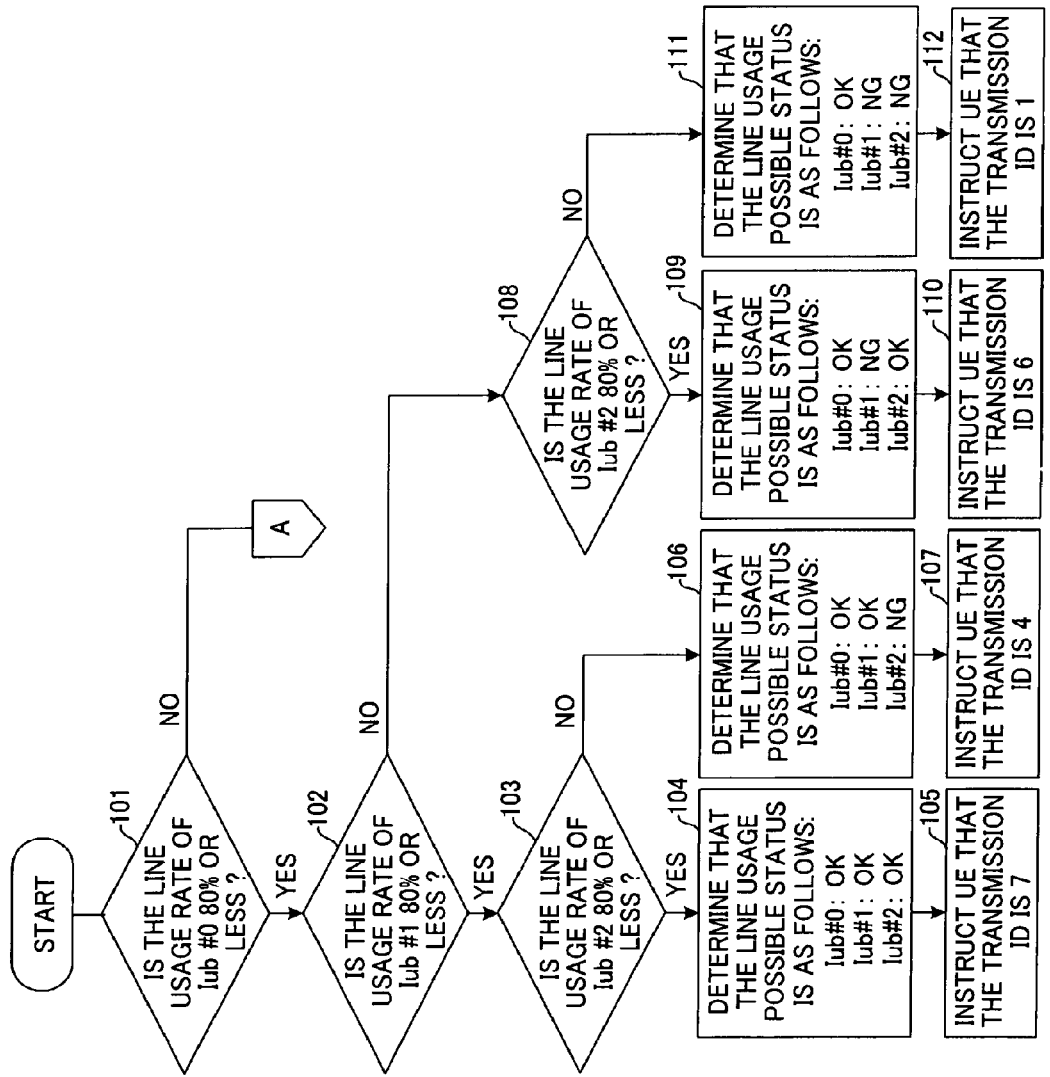
FIG. 4A and FIG. 4B are flowcharts of the process for determining the most optimal transmission path/paths.
Figure 4B:
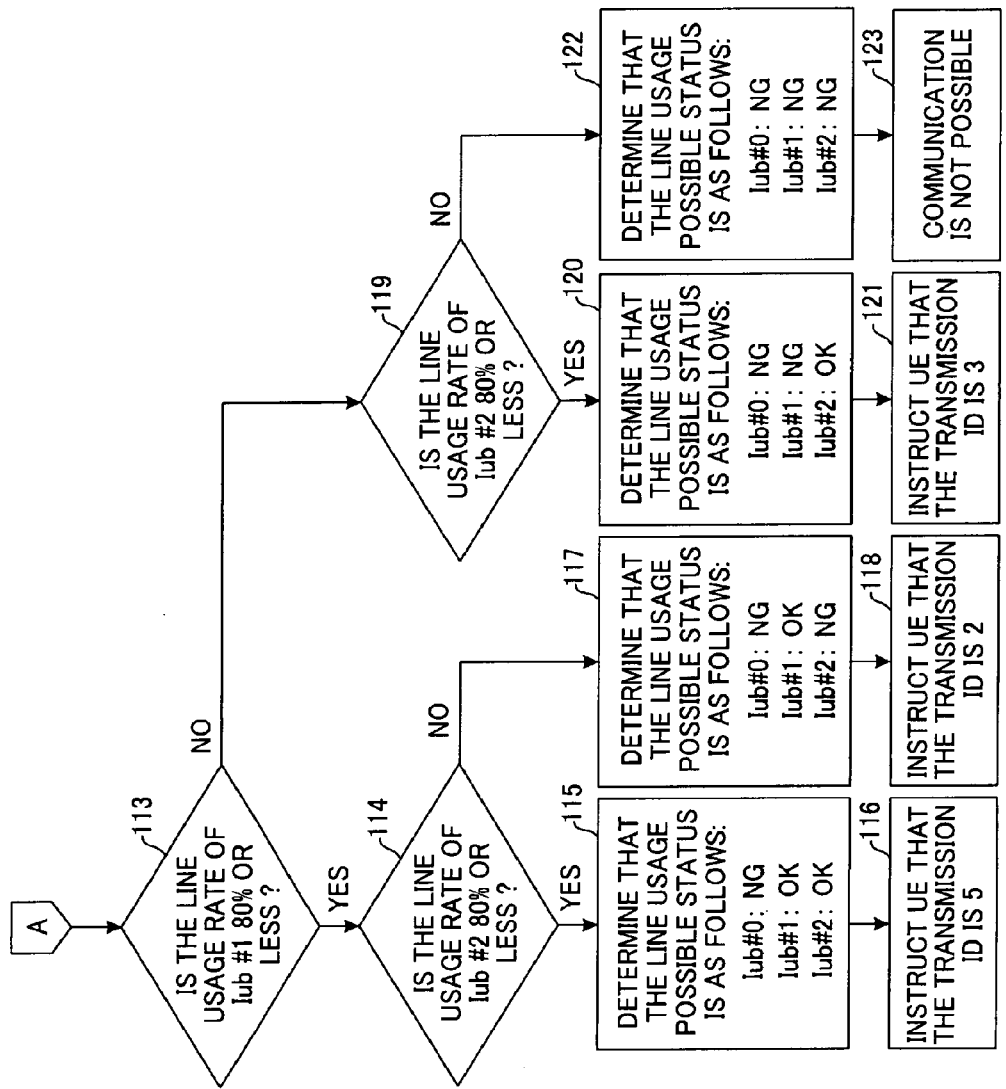

FIG. 4A and FIG. 4B are flowcharts of the transmission path determination process of steps S05 to S06.

The data transmission path determination/notification unit 29 checks whether the line usage rates η of Iub #0, Iub #1 and Iub #2 are a set value, for example 80% or less. The line usage rate is the ratio of the maximum allowable bandwidth Bmax and the actually allotted bandwidth (used bandwidth) Buse, and can be calculated from the following equation.

$$\eta = (Buse/Bmax) \times 100 (\%)$$

When the line usage rates of all of the lines Iub #0, Iub #1 and Iub #2 are 80% or less (steps 101 to 103), the data transmission path determination/notification unit 29 determines that all of the lines Iub #0, Iub #1 and Iub #2 can be used (step 104), and sends the identifier ID=7 (see FIG. 2) to the mobile station (step 105).

When the line usage rates of two lines Iub #0 and Iub #1 are 80% or less and the line usage rate of line Iub #2 is greater than 80% (steps 101 to 103), the data transmission path determination/notification unit 29 determines that lines Iub #0 and Iub #1 can be used and that line Iub #2 cannot be used (step 106), and sends the identifier ID=4 to the mobile station (step 107).

When the line usage rates of two lines Iub #0 and Iub #2 are 80% or less and the line usage rate of line Iub #1 is greater than 80% (steps 101 to 102, 108), the data transmission path determination/notification unit 29 determines that lines Iub #0 and Iub #2 can be used and that line Iub #1 cannot be used (step 109), and sends the identifier ID=6 to the mobile station (step 110).

When the line usage rate of one line Iub #0 is 80% or less, and the usage rates of two lines Iub #1 and Iub #2 are greater than 80% (steps 101 to 102, 108), the data transmission path determination/notification unit 29 determines that line Iub #0 can be used and that lines Iub #1 and Iub #2 cannot be used (step 111), and sends the identifier ID=1 to the mobile station (step 112).

When the line usage rates of two lines Iub #1 and Iub #2 are 80% or less and the line usage rate of line Iub #0 is greater than 80% (steps 101, 113 to 114), the data transmission path determination/notification unit 29 determines that lines Iub #1 and Iub #2 can be used and that line Iub #0 cannot be used (step 115), and sends the identifier ID=5 to the mobile station (step 116).

When the line usage rate of one line Iub #1 is 80% or less, and the usage rates of two lines Iub #0 and Iub #2 are greater than 80% (steps 101, 113 to 114), the data transmission path determination/notification unit 29 determines that line Iub #1 can be used and that lines Iub #0 and Iub #2 cannot be used (step 117), and sends the identifier ID=2 to the mobile station (step 118).

When the line usage rate of one line Iub #2 is 80% or less, and the usage rates of two lines Iub #0 and Iub #1 are greater than 80% (steps 101, 113, 119), the data transmission path determination/notification unit 29 determines that line Iub #2 can be used and that lines Iub #0 and Iub #1 cannot be used (step 120), and sends the identifier ID=3 to the mobile station (step 121).

When the line usage rates of all of the lines Iub #0, Iub #1 and Iub #2 are greater than 80% (step 122), the data transmission path determination/notification unit 29 determines that communication is not possible (step 123).

(C) Data Transmission Image

Figure 5:
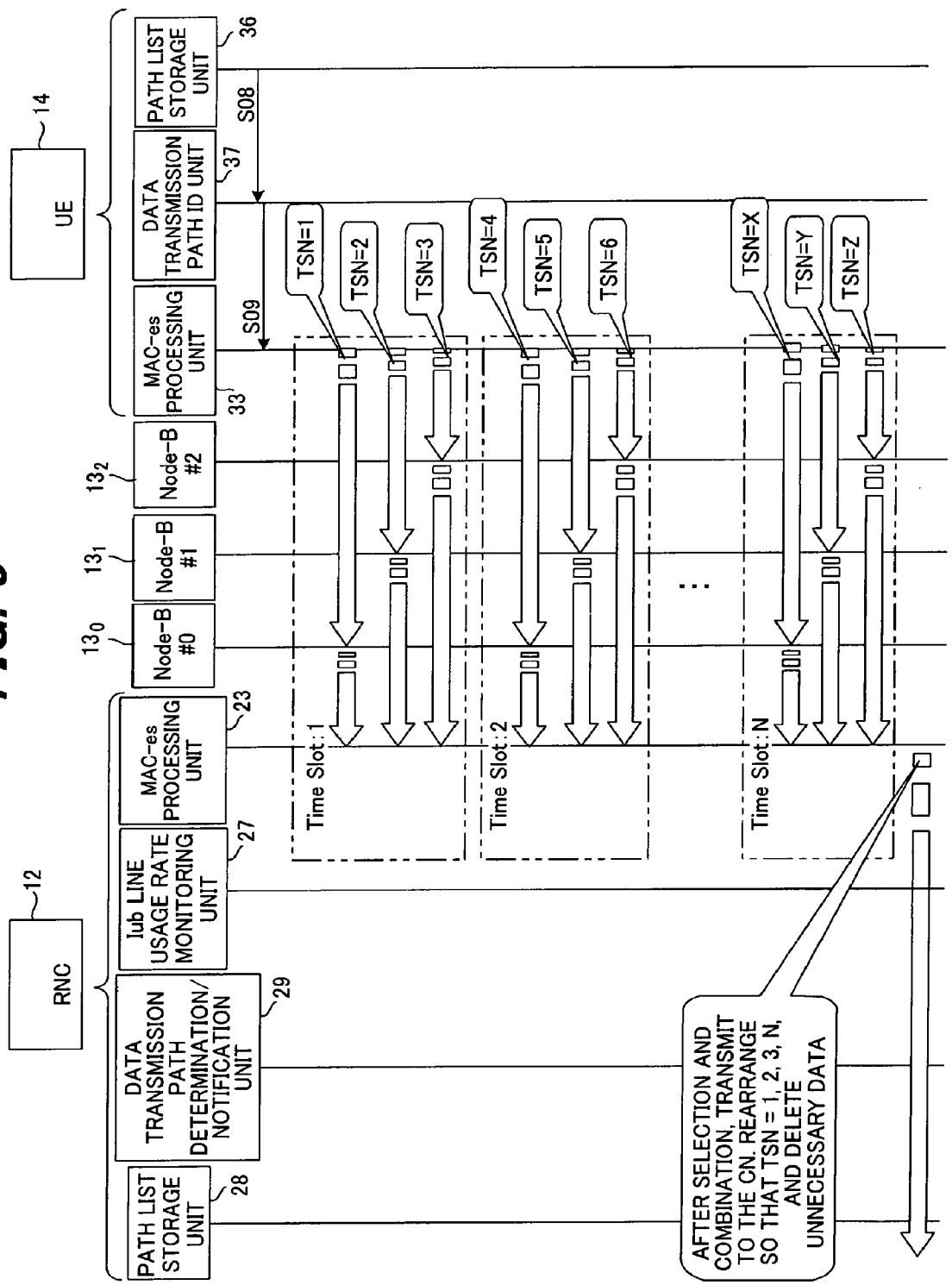
FIG. 5 is a drawing for explaining the data transmission operation by the mobile station when the radio network controller specifies ID=0 as the identifier that specifies the data transmission path/paths.

FIG. 5 is a drawing for explaining the data transmission operation by the mobile station 14 when the radio network controller 12 instructs ID=7 as the identifier that specifies the data transmission path/paths. The data transmission path ID unit 37 of mobile station 14 makes a reference to the path list PLT to find the data transmission paths that correspond to identifier ID=7 and sets them in the MAC-es processing unit 33. The MAC-es processing unit 33 creates three different sets of MAC-es PDU data for the first time slot according to an instruction from the data transmission path ID unit 37, attaches respective transmission sequence numbers TSN=1, 2, 3 to each and inputs the data to the MAC-e processing units $34_0$ to $34_2$. Next, the MAC-es processing unit 33 creates three different sets of MAC-es PDU data for the second time slot, attaches respective transmission sequence numbers TSN=4, 5, 6 to each and inputs the data to the MAC-e processing units $34_0$ to $34_2$. After that, the MAC-es processing unit 33 similarly creates three different sets of MAC-es PDU data for each time slot, attaches respective transmission sequence numbers TSN=X, Y, Z to each and inputs the data to the MAC-e processing units $34_0$ to $34_2$.

FIG. 6 is a drawing for explaining the TSN that are assigned by the MAC-es processing unit 33 of the mobile station 14 for each time slot, and the transmission data image to MAC-e. The transmission sequence number TSN increases by three for each time slot. Also, in the case of identifier ID=7, three sets of MAC-es PDU data A1 to A3, A4 to A6, ... A13 to A15 are transmitted to the MAC-e processing units $34_0$ to $34_2$ for each time slot.

The MAC-e processing units $34_0$ to $34_2$ multiplex a plurality of MAC-es PDU data to create MAC-e PDU data and transmits that data as transport block data over the corresponding paths PT0 to PT2. After that, the MAC-es processing unit 33 and MAC-e processing units $34_0$ to $34_2$ perform the same processing as described above for each time slot and transmit three different sets of data over paths PT0 to PT2.

On the other hand, the MAC-es processing unit 23 of the radio network controller 12 divides out the MAC-d PDU data from the MAC-es PDU data that has been divided out from the MAC-e PDU data by each MAC-e processing unit, as well as rearranges the data by reference to the transmission sequence numbers TSN, then inputs that data to the MAC-d processing unit 24. The MAC-d processing unit 24 gives the MAC-d PDU data as is to the RLC processing unit 25 as RLC-PDU data, and the RLC processing unit 25 removes the header from the RLC-PDU data resulting in dedicated data and transmits this dedicated data to the core network 11.

Figure 7:
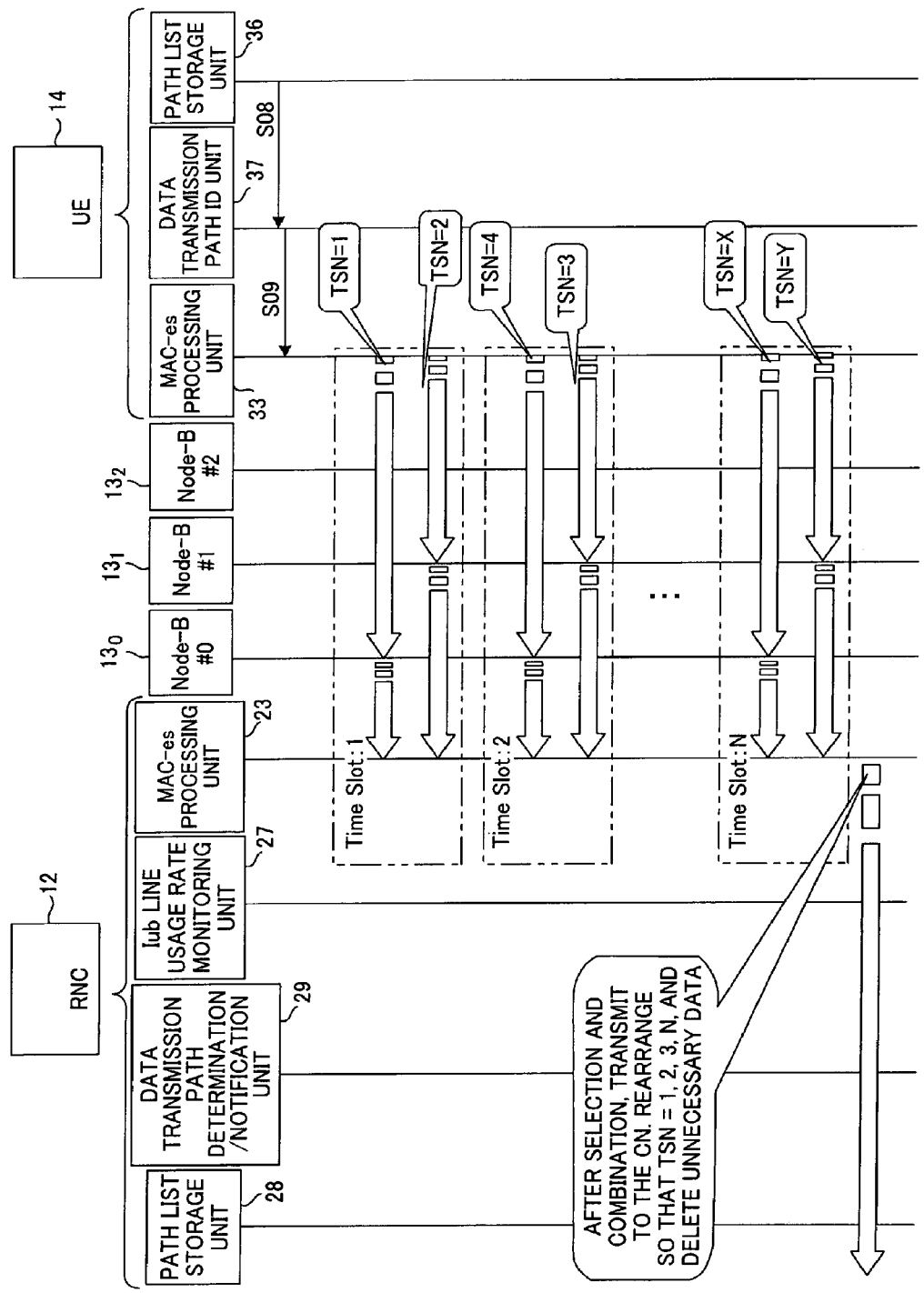
FIG. 7 is a drawing for explaining the data transmission operation by the mobile station when the radio network controller specifies ID=1 as the identifier that specifies the data transmission path/paths.

FIG. 7 is a drawing for explaining the data transmission operation by the mobile station 14 when the radio network controller 12 instructs ID=4 as the identifier that specifies the data transmission path/paths.

The data transmission path ID unit 37 of the mobile station 14 makes a reference to the path list PLT to find the data transmission paths (PT0, PT1) that corresponds to the identifier ID=4 and sets them in the MAC-es processing unit 33. The MAC-es processing unit 33 creates two sets of different MAC-es PDU data for the first time slot according to an instruction from the data transmission path ID unit 37, attaches respective transmission sequence numbers TSN=1, 2 to each and inputs the data to the MAC-e processing units $34_0$ to $34_1$. Next, the MAC-es processing unit 33 creates two sets of different MAC-es PDU data for the second time slot according to an instruction from the data transmission path ID unit 37, attaches respective transmission sequence numbers TSN=3, 4 to each and inputs the data to the MAC-e processing units $34_0$ to $34_1$. After that, the MAC-es processing unit 33 similarly creates two different sets of MAC-es PDU data for each time slot, attaches respective transmission sequence numbers TSN=X, Y to each and inputs the data to the MAC-e processing units $34_0$ to $34_1$.

FIG. 8 is a drawing for explaining the TSN that are assigned by the MAC-es processing unit 33 of the mobile station 14 for each time slot, and the transmission data image to MAC-e. The transmission sequence number TSN increases by two for each time slot. Also, in the case of identifier ID=4, two MAC-es PDU data A1 to A2, A3 to A4, ... Ax to Ay are transmitted to the MAC-e processing units $34_0$ to $34_1$ for each time slot.

The MAC-e processing units $34_0$ to $34_1$ multiplex a plurality of MAC-es PDU data to create MAC-e PDU data and transmit that data as transport block data over the corresponding paths PT0 to PT1. After that, the MAC-es processing unit 33 and the MAC-e processing units $34_0$ to $34_1$ perform the same processing as described above for each time slot and transmit two different sets of data over the paths PT0 to PT1.

On the other hand, the MAC-es processing unit 23 of the radio network controller 12 divides out the MAC-d PDU data from the MAC-es PDU data that has been divided out from the MAC-e PDU data by each MAC-e processing unit, as well as rearranges the data by reference to the transmission sequence numbers TSN, then inputs that data to the MAC-d processing unit 24. The MAC-d processing unit 24 gives the MAC-d PDU data as is to the RLC processing unit 25 as RLC-PDU data, and the RLC processing unit 25 removes the header from the selected RLC-PDU data resulting in dedicated data and transmits this dedicated data to the core network 11.

(D) Variation of Control for Determining the Data Transmission Path/Paths

In the embodiment described above, the data transmission path/paths were determined by the process shown in FIG. 4A and FIG. 4B based on the line usage rate, however, it is also possible to determine the data transmission path/paths by measuring other characteristics that indicate a network environment instead of using the line usage rate. Change in a network environment can be measured by (1) radio quality, (2) communication delay time between the RNC and Node B, (3) E-DCH throughput status, (4) Iub quality, etc. Therefore, it is possible to perform control so that the data transmission path/paths are set by measuring these characteristics. Moreover, it is possible to perform control so that the data transmission path/paths are determined by measuring two or more of these characteristics.

Figure 9:
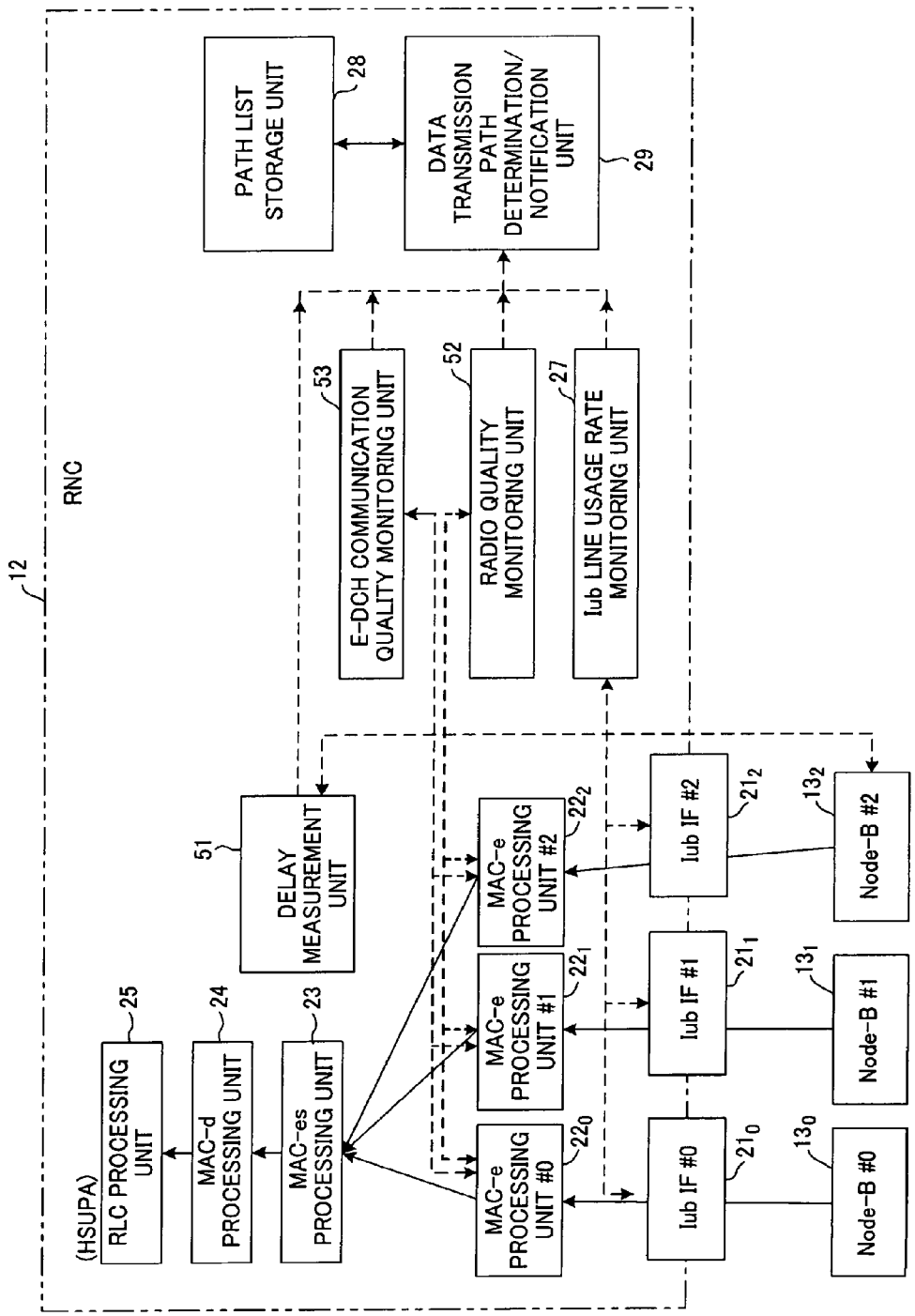
FIG. 9 is a drawing of the construction of a radio network controller that measures the characteristics of the network environment and determines the data transmission path/paths.

FIG. 9 is a drawing of the construction of a radio network controller 12 that measures the aforementioned characteristics and determines the data transmission path/paths, where the same reference numbers are given to parts that are the same as those of the construction shown in FIG. 1. This construction differs in that there is: a delay measurement unit 51 that measures the communication delay status between the RNC and Nodes B, a radio quality monitoring unit that monitors the radio quality between the mobile station and base stations, and a E-DCH communication quality monitoring unit 53 that monitors E-DCH throughput information or Iub quality.

The delay measurement unit 51 acquires the communication delay status between the RNC and Nodes B using a conventional function. In other words, the delay measurement unit 51 periodically transmits a packet for measuring delay to each base station and measures the time until a response is returned, then inputs that time to the data transmission path determination/notification unit 29 as the delay time of the Iub line. The data transmission path determination/notification unit 29 determines that the communication quality of an Iub line is good when the delay time is short.

Figure 20:
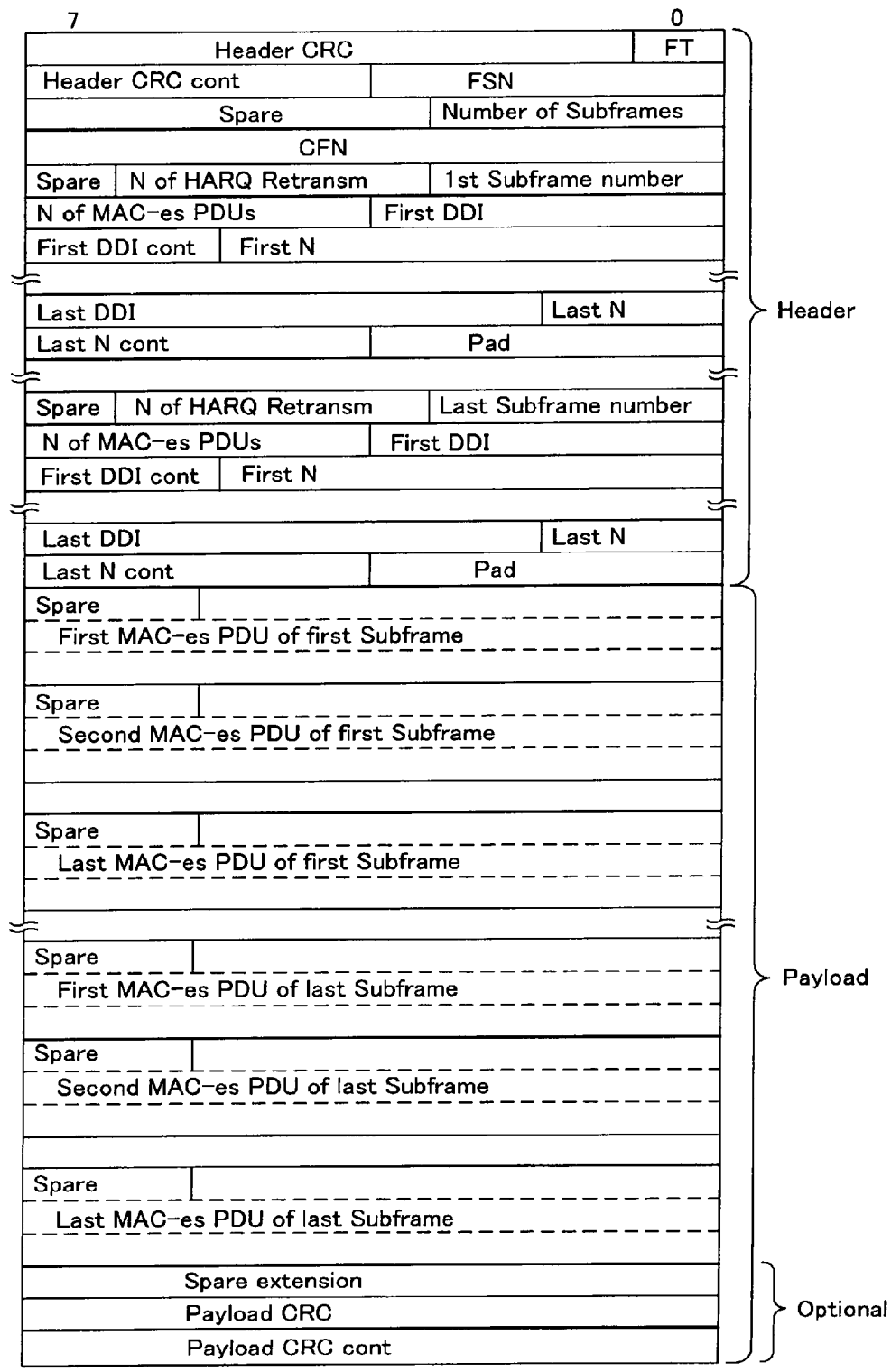
FIG. 20 is a drawing that explains an EDCH Iub FP frame.
Figure 21:
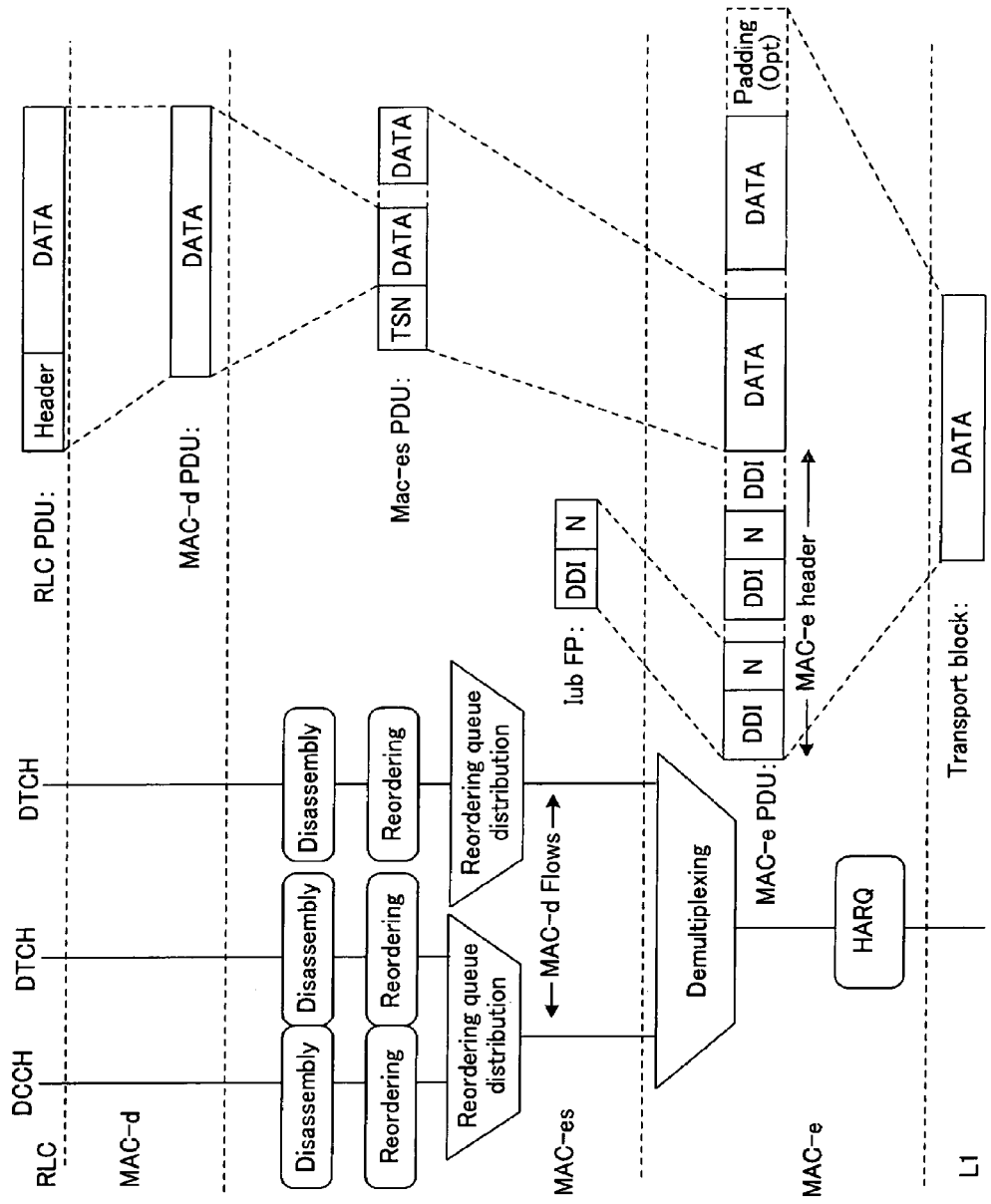
FIG. 21 is a drawing that explains the processing by a radio network controller.

The radio quality monitoring unit 52 monitors the radio quality based on the N of HARQ Retransm (number of retransmissions in the radio zone) within the E-DCH Iub FP frame shown in FIG. 20, and inputs the number of retransmissions to the data transmission path determination/notification unit 29. The data transmission path determination/notification unit 29 determines that the quality is poor when the number of retransmissions is greater than a set number, and that the quality is good when the number of transmissions is less than that set number.

The E-DCH communication quality monitoring unit 53 monitors the frame amount of E-DCH Iub FP (see FIG. 20) that the MAC-e processing units $22_0$ to $22_2$ received over a set period of time as E-DCH throughput information, and inputs that frame amount to the data transmission path determination/notification unit 29. The data transmission path determination/notification unit 29 determines that the communication quality of a line is good when the frame amount is greater than a set value. Also, the E-DCH communication quality monitoring unit 53 checks the FSN continuity within the E-DCH Iub FP (See FIG. 20), and inputs information indicating whether there is continuity or no continuity to the data transmission path determination/notification unit 29. The data transmission path determination/notification 29 unit determines that the quality is good when there is FSN continuity.

Figure 10A:
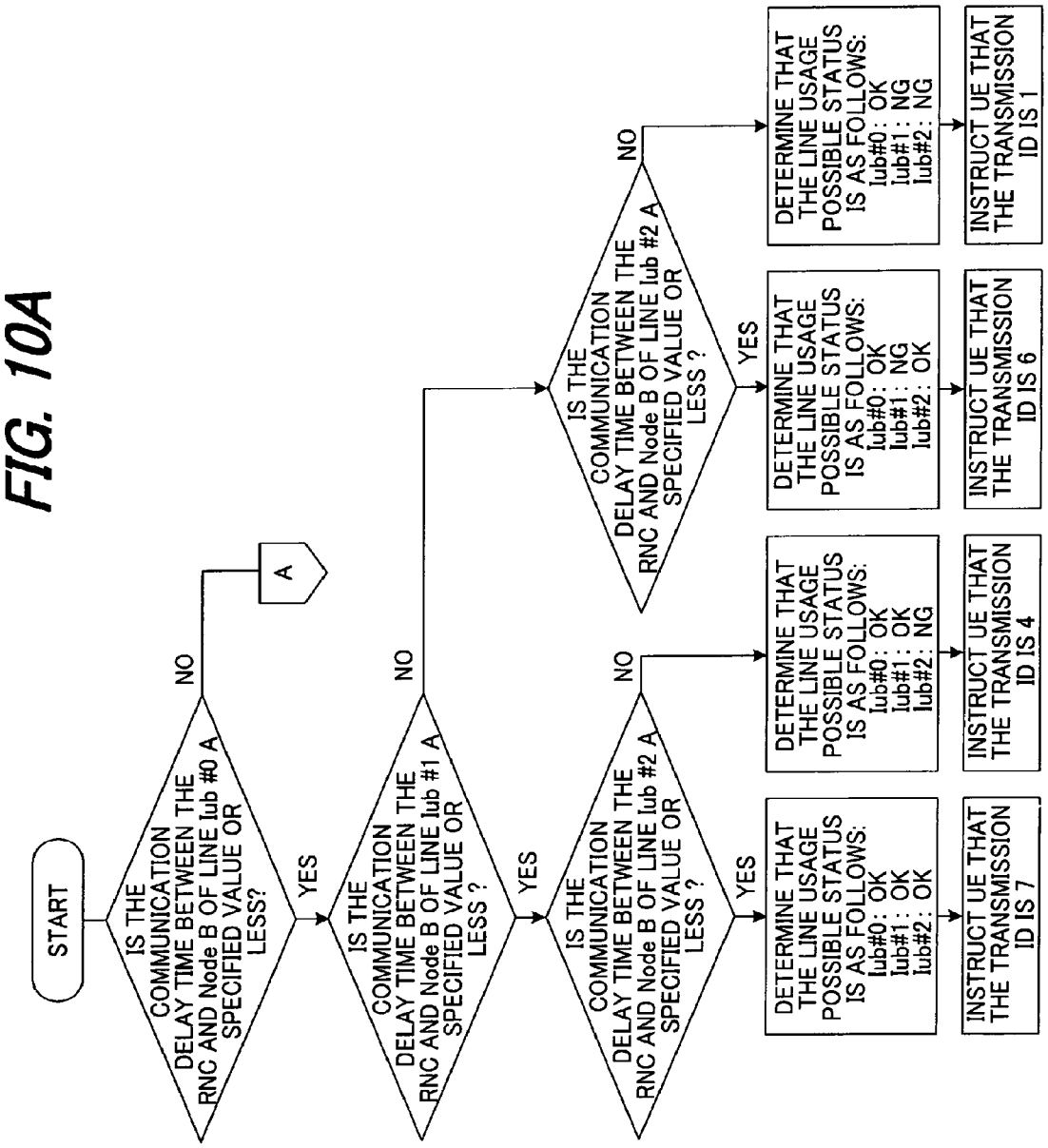
FIG. 10 A and FIG. 10B are flowcharts showing the processing performed by the data transmission path determination/notification unit that determines the data transmission path/paths according to the communication delay time.
Figure 10B:
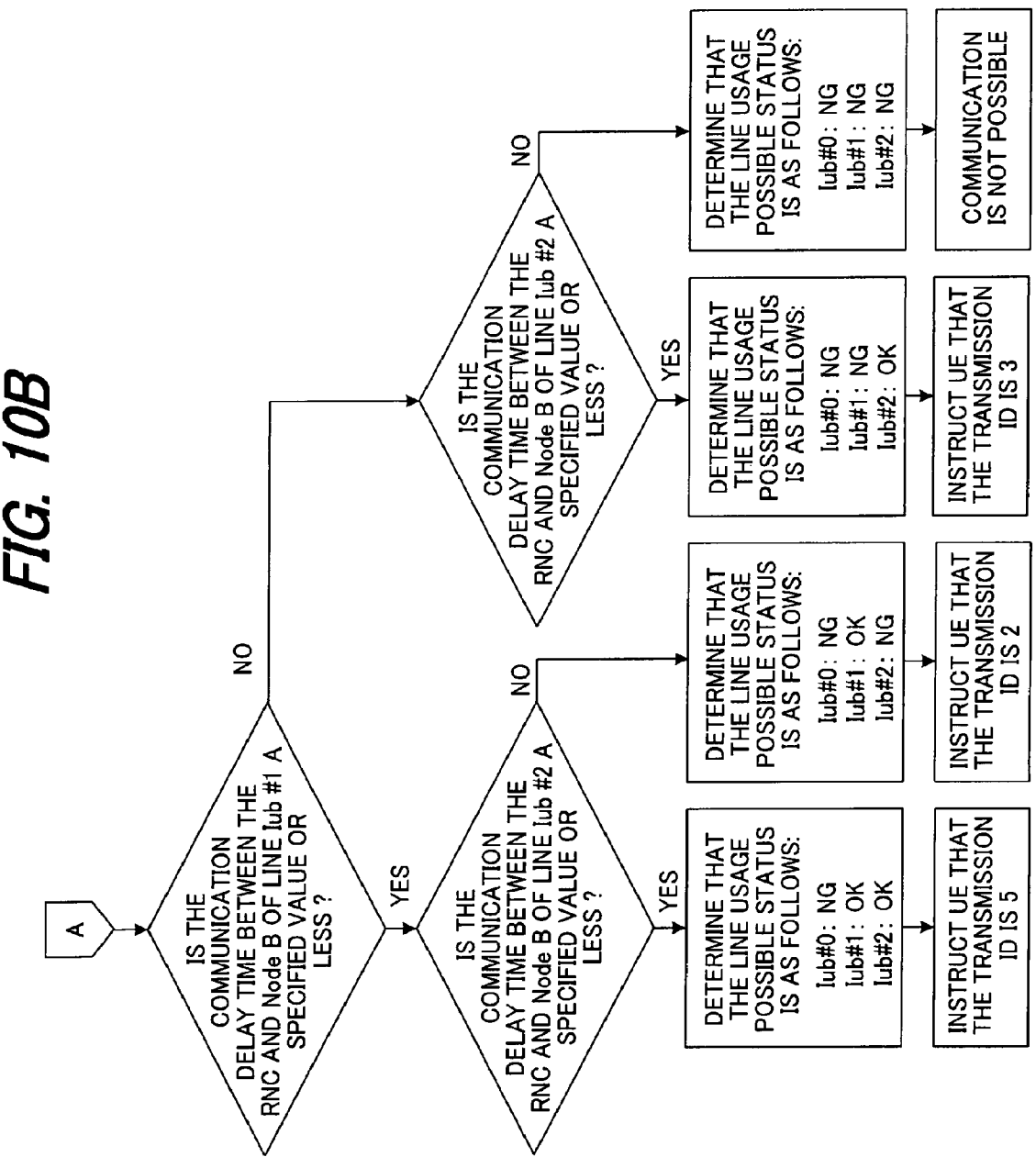

FIG. 10 A and FIG. 10B are flowcharts showing the processing performed by the data transmission path determination/notification unit 29 that determines the data transmission path/paths according to the communication delay time, where a combination of data transmission paths is determined so that when the communication delay time of a line is less than a set time, data is transmitted over that line, and when the delay time of a line is greater than a set time, data is not transferred over that line, an identifier ID that specifies that combination is then found and the mobile station is notified of that identifier ID. FIG. 10A and FIG. 10B are flowcharts of processing that follows the same logic as the processing shown in FIG. 4A and FIG. 4B.

Figure 11A:
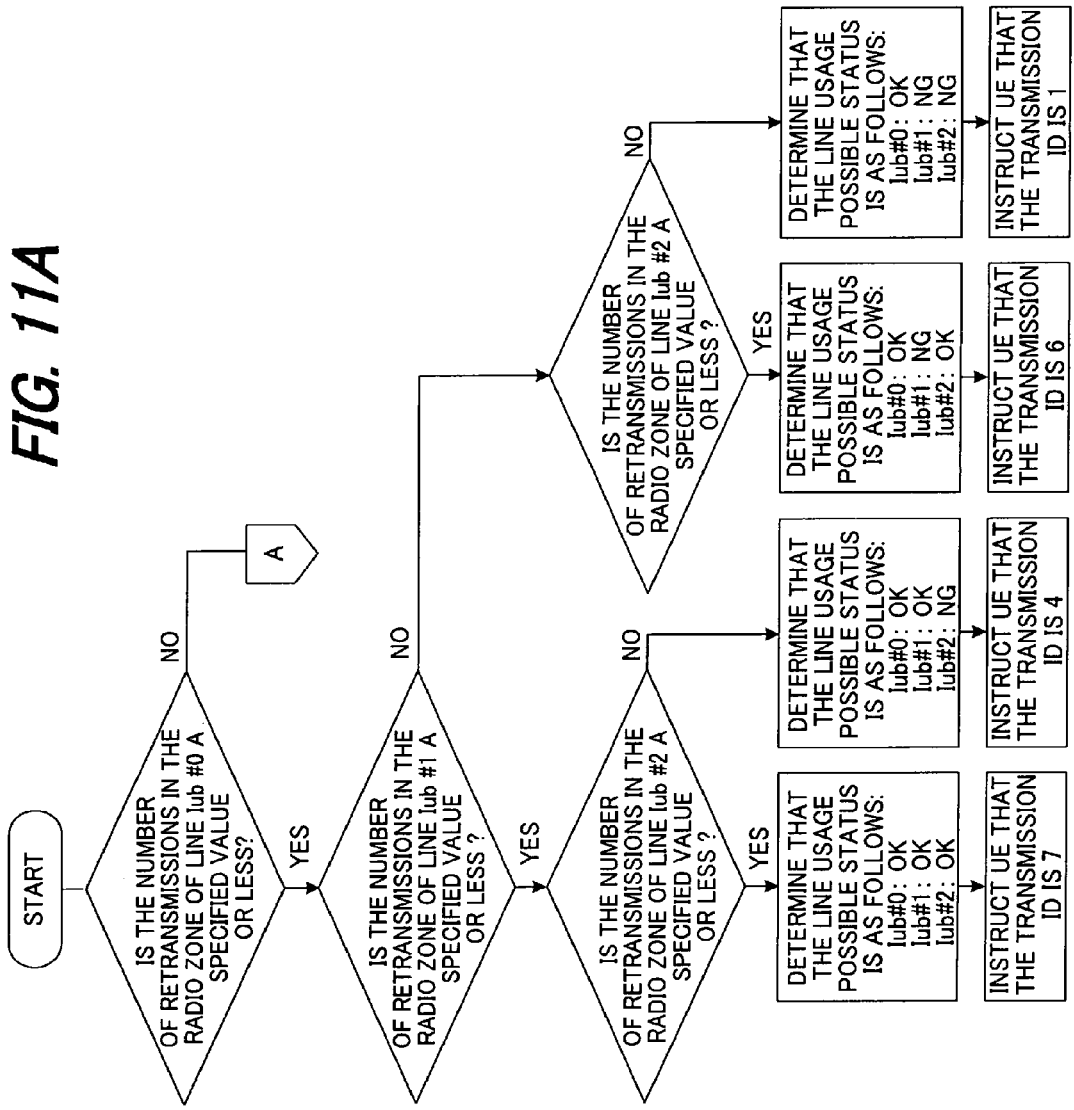
FIG. 11A and FIG. 11B are flowcharts showing the processing performed by the data transmission path determination/notification unit that determines the data transmission path/paths according to the number of retransmissions.
Figure 11B:
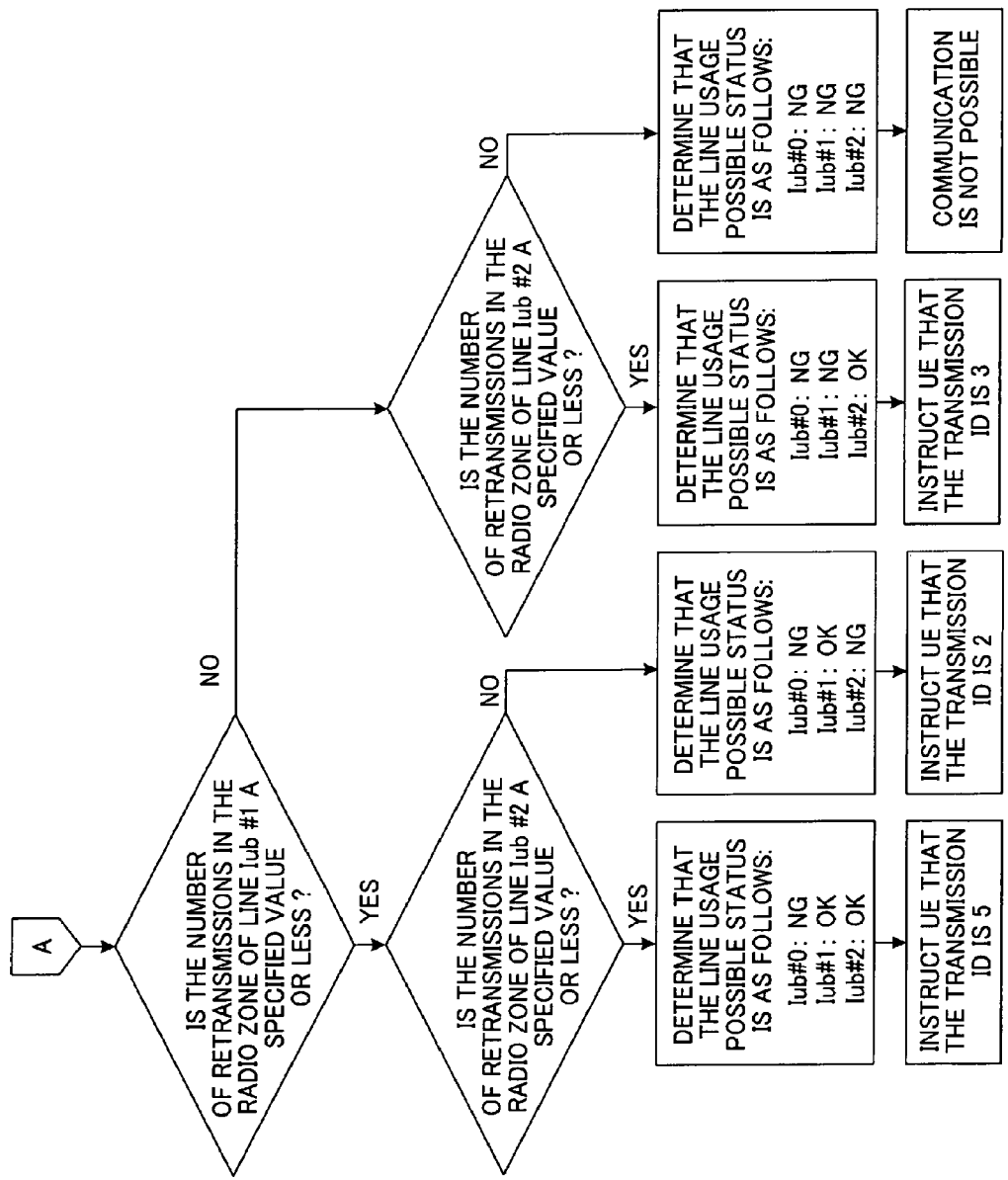

FIG. 11A and FIG. 11B are flowcharts showing the processing performed by the data transmission path determination/notification unit 29 that determines the data transmission path/paths according to the number of retransmissions, where a combination of data transmission paths is determined so that when the number of retransmissions of a line is less than a set number of times, data is transmitted over that line, and when greater than the set number of times, data is not transmitted over that line, an identifier ID that specifies that combination is then found and the mobile station is notified of that identifier ID.

Figure 12A:
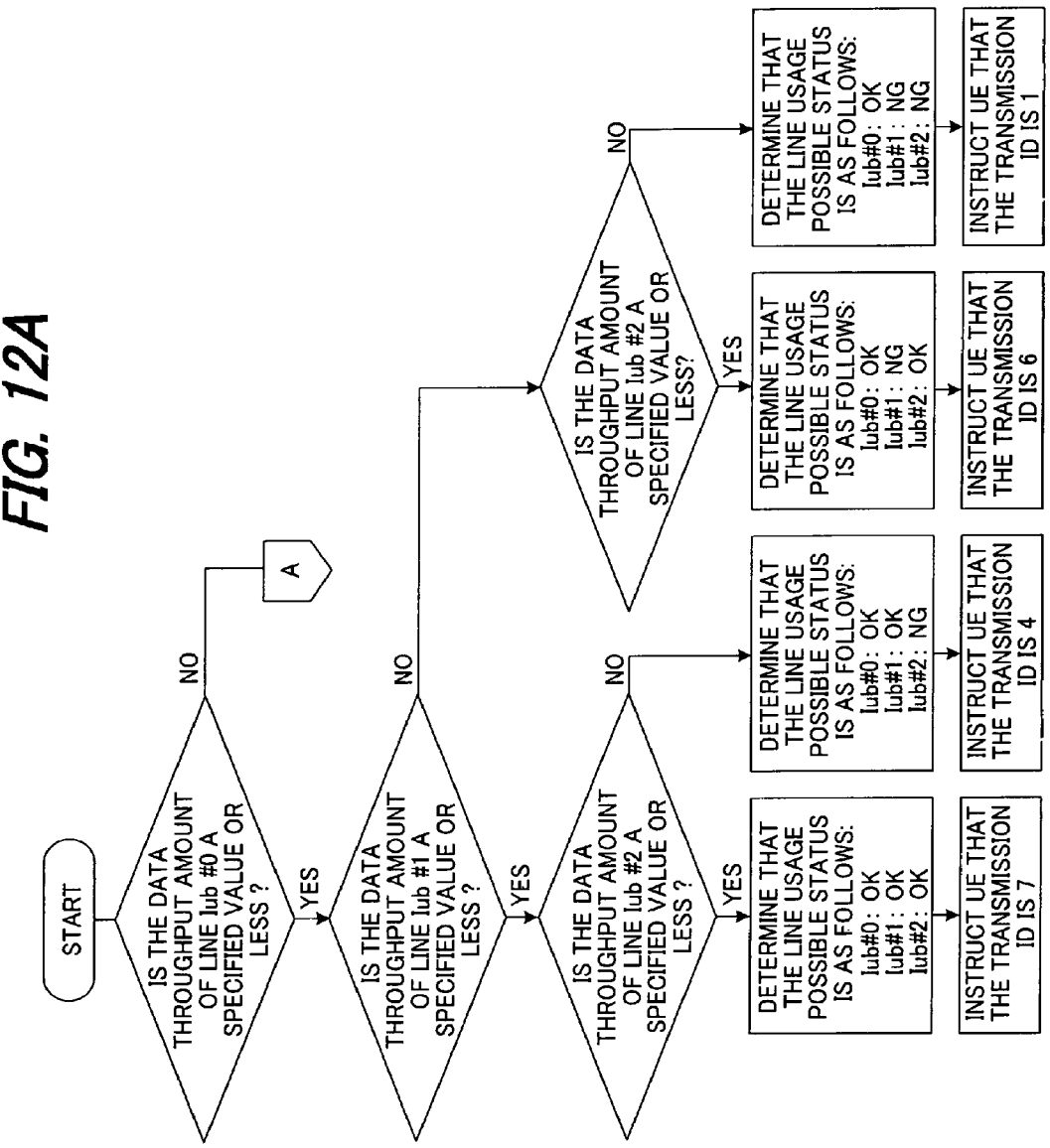
FIG. 12 A and FIG. 12B are flowcharts showing the processing performed by the data transmission path determination/notification unit that determines the data transmission path/paths according to the amount of data throughput.
Figure 12B:
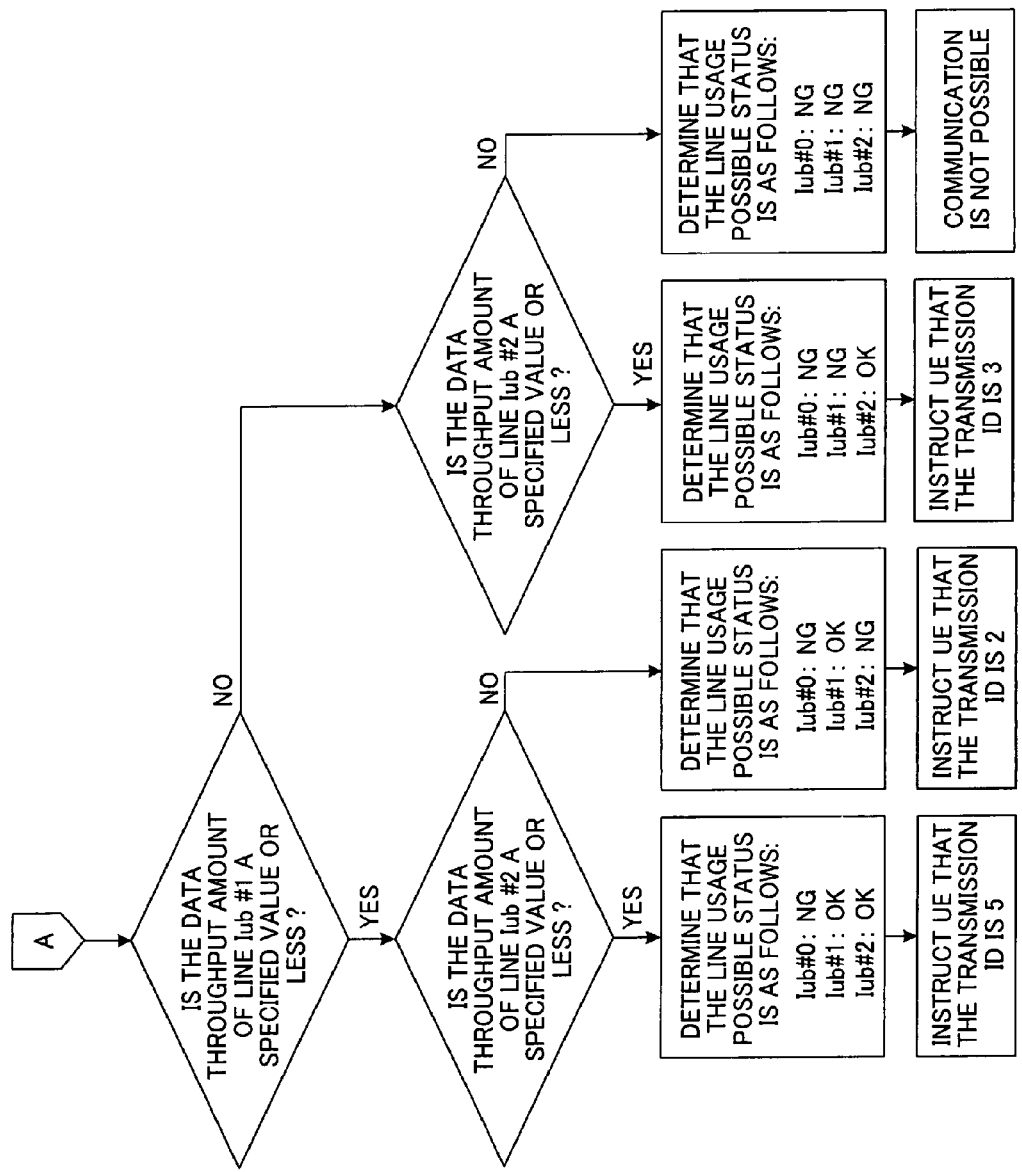

FIG. 12A and FIG. 12B are flowcharts showing the processing performed by the data transmission path determination/notification unit 29 that determines the data transmission path/paths according to the amount of data throughput, where a combination of data transmission paths is determined so that when the amount of throughput of a line is greater than a set value, data is transmitted over that line, and when less than the set number of time, data is not transmitted over that line, an identifier ID that specifies that combination is then found and the mobile station is notified of that identifier ID.

Figure 13A:
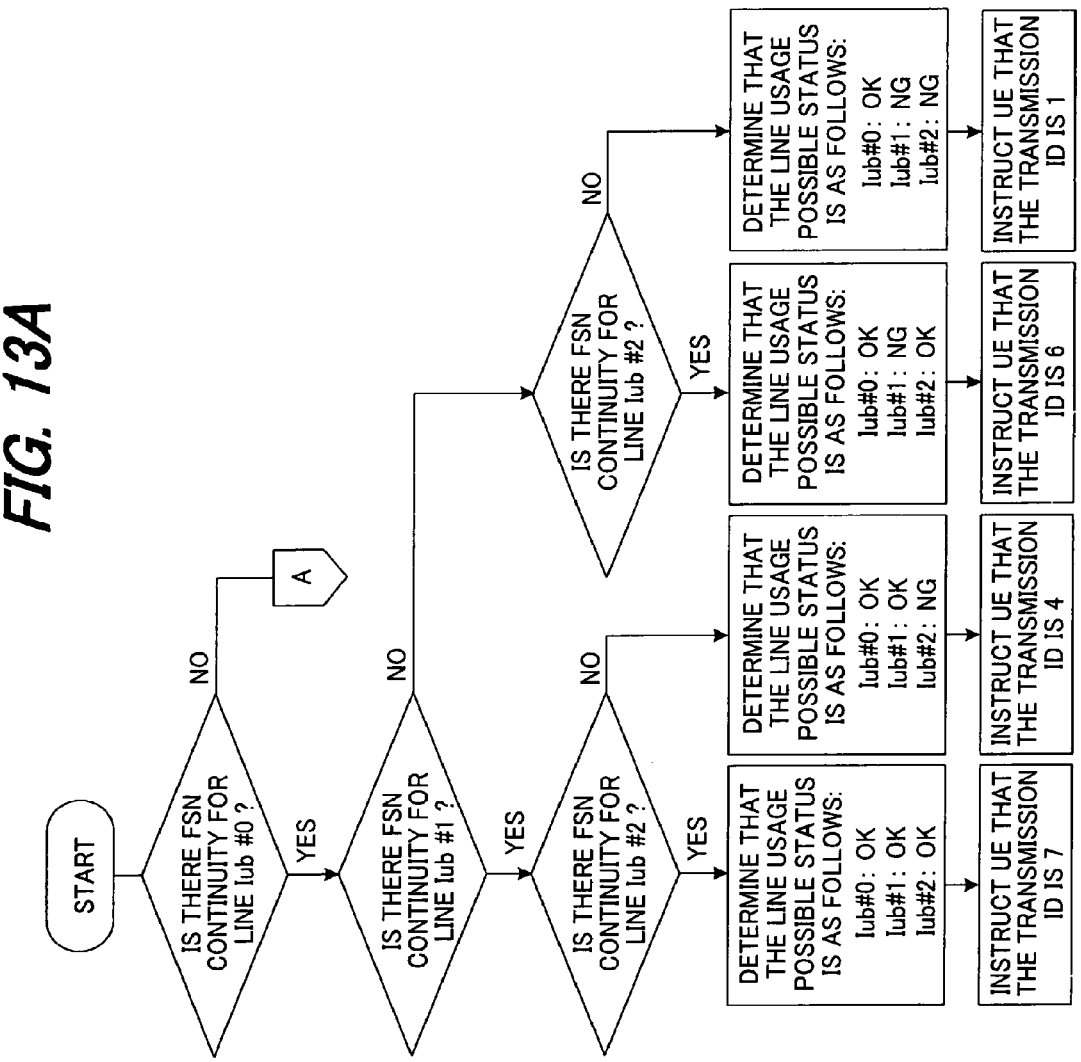
FIG. 13 A and FIG. 13B are flowcharts showing the processing performed by the data transmission path determination/notification unit that determines the data transmission path/paths according to continuity of the FSN.
Figure 13B:
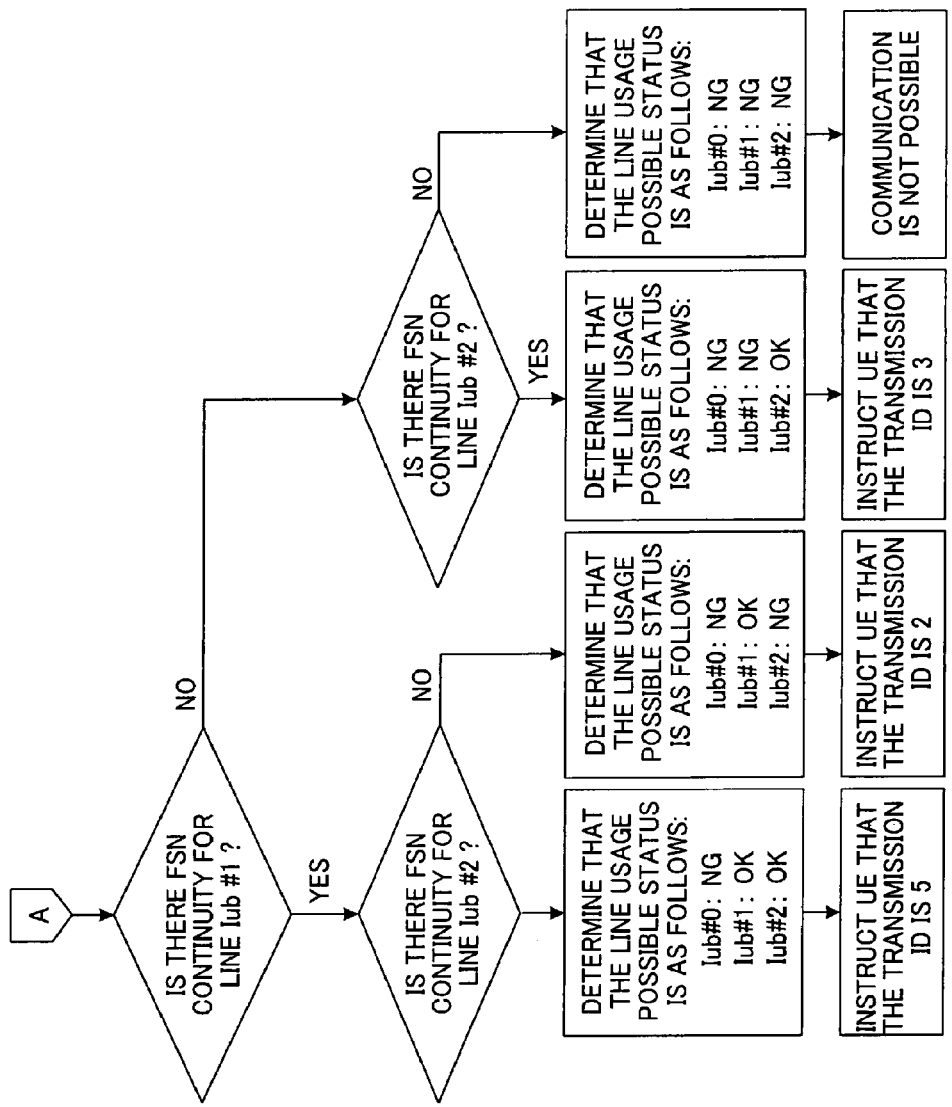
Figure 14:
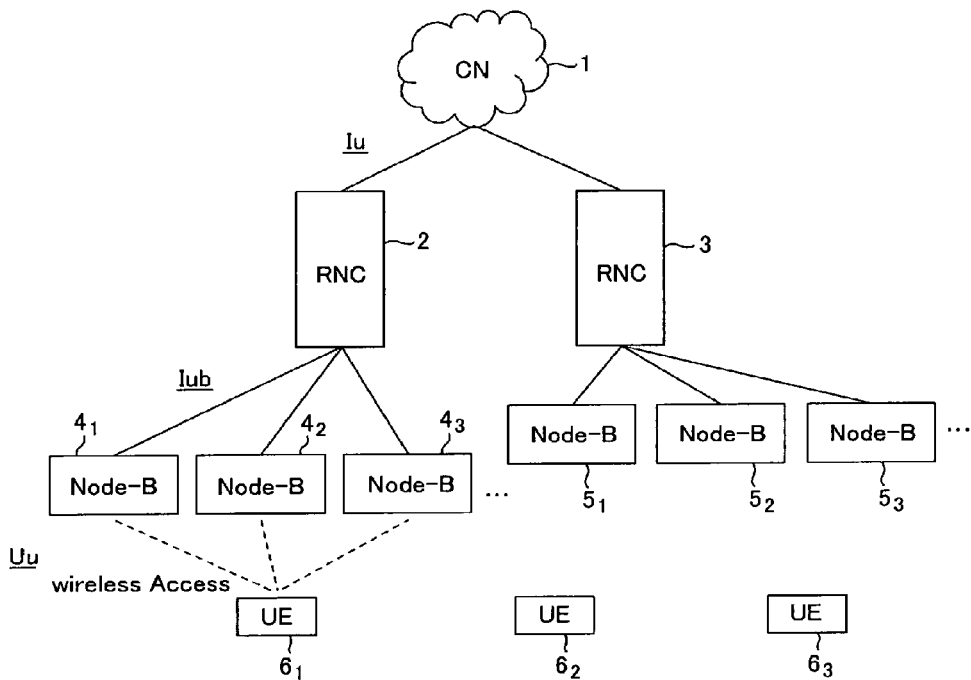
FIG. 14 is a drawing that shows the construction of a radio communication system in which the lines of the W-CDMA mobile communication system are shared by a plurality of users.
Figure 15:
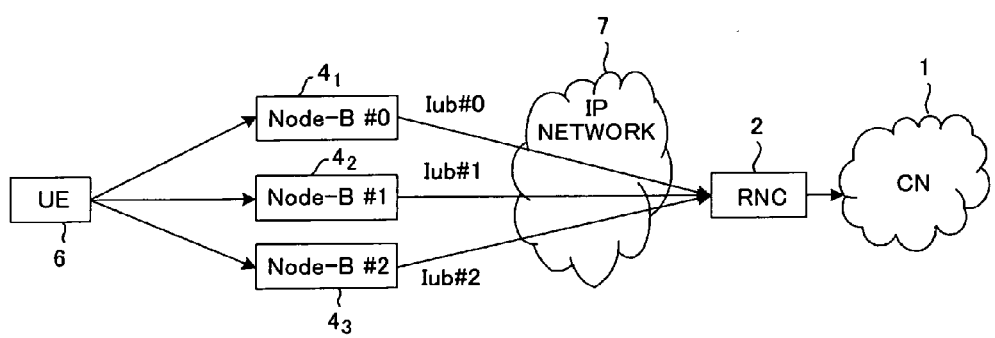
FIG. 15 is a drawing that explains the logical connection in the HSUPA method during handover.
Figure 16:
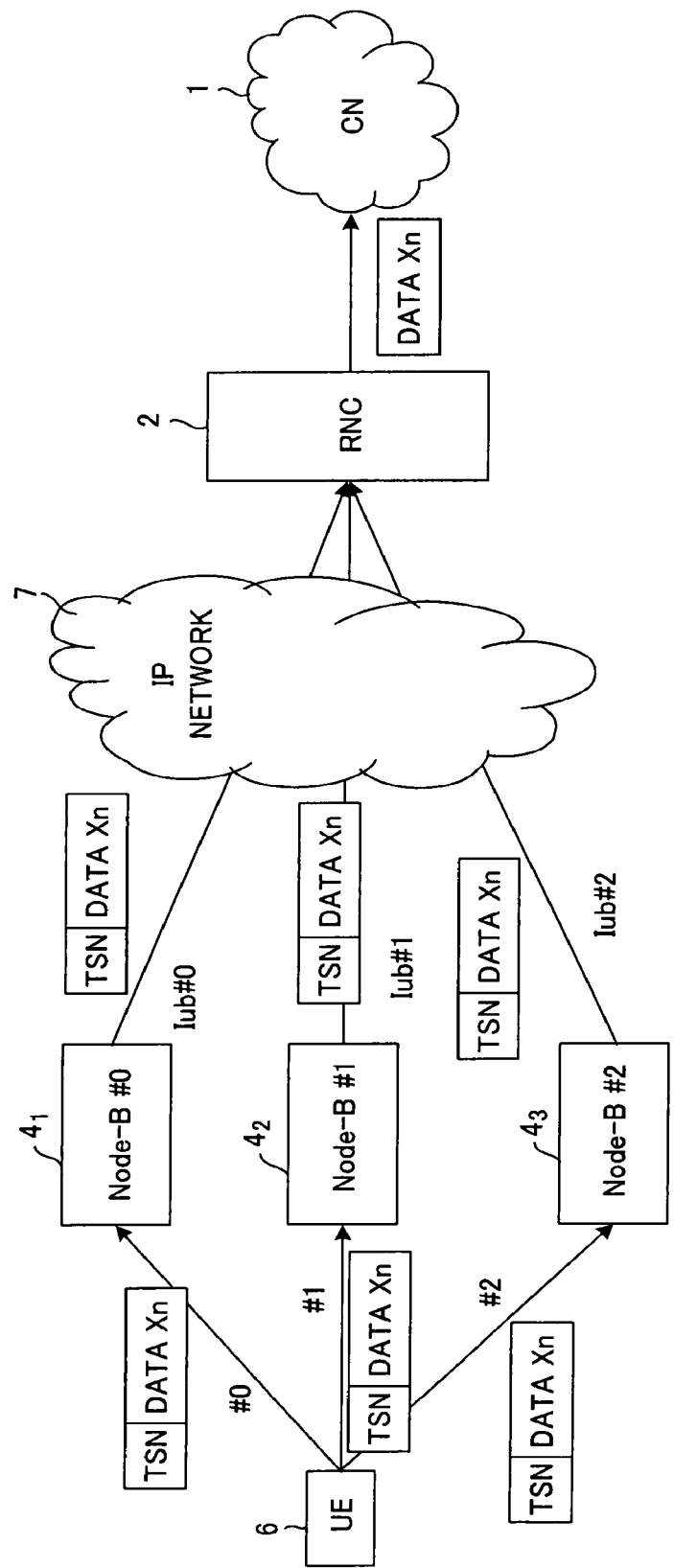
FIG. 16 is another drawing that explains the logical connection in the HSUPA method during handover.
Figure 17:
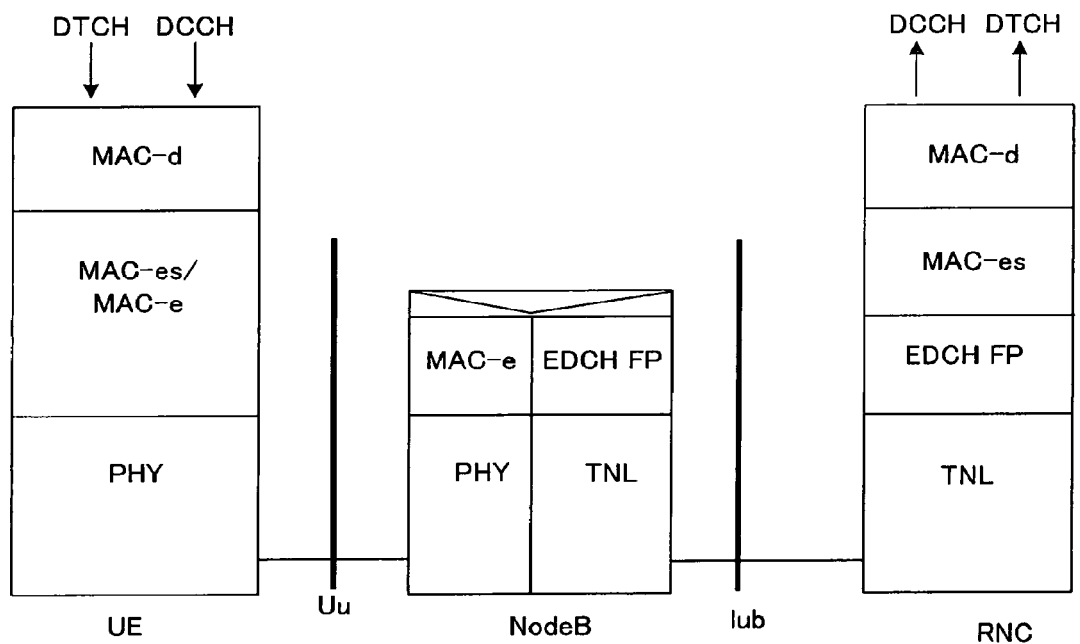
FIG. 17 is a drawing showing the layer structure of each unit in the HSUPA method.

FIG. 13 A and FIG. 13B are flowcharts showing the processing performed by the data transmission path determination/notification unit 29 that determines the data transmission path/paths according to FSN continuity, where a combination of data transmission paths is determined so that when there is a line having FSN continuity, data is transmitted over that line, and when there is no FSN continuity, data is not transmitted over that line, an identifier ID that specifies that combination is then found and the mobile station is notified of that identifier ID.

As many apparently widely different embodiments of the present invention can be made without departing from the spirit and scope thereof, it is to be understood that the invention is not limited to the specific embodiments thereof except as defined in the appended claims.

What is claimed is:

1. A communication method in a mobile communication system that transmits different data over a plurality of paths between a mobile station and a base station, comprising:
   monitoring a communication state of each path between a mobile station and a base station by the base station;
   determining whether to transmit data over at least one of a plurality of paths or to transmit data over two or more paths of the plurality of paths, or to transmit data over only one path of the plurality of paths based on the communication state of each path and determining a path or paths used to transmit data;
   notifying the mobile station of the determined path or paths of the plurality of paths; and
   transmitting respective different data to which different transmission sequence numbers have been attached, over said notified path or paths between the mobile station and the base station.

2. A base station in a mobile communication system that transmits different data to which transmission sequence numbers have been attached, over a plurality of paths between a mobile station and a base station, comprising:
   a communication state monitoring unit that monitors a communication state of each path between a mobile station and a base station;
   a data transmission path notification unit that determines whether to transmit data over at least one of a plurality of paths or to transmit data over two or more paths of the plurality of paths, or to transmit data over only one path of the plurality of paths based on the communication state of each path, determines a path or paths of the plurality of paths used to transmit data and notifies the mobile station of the determined path or paths; and a processing unit that rearranges the different data received from said determined path or paths by reference to said transmission sequence numbers and transmits the rearranged data to a core network.

3. A mobile station in a mobile communication system that transmits different data over a plurality of paths between a mobile station and a base station, comprising:

a list storage unit that receives and stores a correlation list from a base station that correlates path information that indicates which path or paths data is to be transmitted over, and an identifier that specifies that path information;

a data transmission path receiving unit that receives an identifier from the base station that indicates which path or paths said data is to be transmitted over, and makes a reference to said correlation list to obtain the path or paths that correspond to the identifier; and a processing unit that transmits different data, to which different transmission sequence number have been attached, over the path or paths that correspond to said identifier.

4. A mobile communication system that transmits different data to which transmission sequence numbers have been attached, over a plurality of paths between a mobile station and a base station, wherein said base station comprises:

a communication state monitoring unit that monitors a communication state of each path between a mobile station and a base station;

a data transmission path notification unit that determines whether to transmit data over at least one of a plurality of paths or to transmit data over two or more paths of the plurality of paths, or to transmit data over only one path of the plurality of paths based on the communication state of each path, determines a path or paths of the plurality of paths used to transmit different data, and notifies the mobile station of the determined path or paths; and a processing unit that rearranges the different data received from said determined path or paths by reference to said transmission sequence numbers and transmits the rearranged data to a core network; and said mobile station comprises:

a receiving unit that receives transmission path specification information from the base station that specifies which path or paths of the plurality of paths data is to be transmitted over; and a processing unit that transmits different data to which different transmission sequence numbers have been attached, over the specified path or paths.

* * * * *